(12) United States Patent
Talur et al.

(10) Patent No.: US 11,088,948 B1
(45) Date of Patent: Aug. 10, 2021

(54) CORRELATING NETWORK FLOWS IN A ROUTING SERVICE FOR FULL-PROXY NETWORK APPLIANCES

(71) Applicant: Amazon Technologies, Inc., Seattle, WA (US)

(72) Inventors: Dheerendra Talur, Sammamish, WA (US); Milind Madhukar Kulkarni, Sammamish, WA (US); Narayan Subramaniam, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/033,274

(22) Filed: Sep. 25, 2020

(51) Int. Cl.
  *G06F 15/16* (2006.01)
  *H04L 12/721* (2013.01)
  *H04L 29/06* (2006.01)
  *H04L 29/08* (2006.01)
  *H04L 12/741* (2013.01)

(52) U.S. Cl.
  CPC .......... *H04L 45/38* (2013.01); *H04L 45/44* (2013.01); *H04L 45/745* (2013.01); *H04L 63/166* (2013.01); *H04L 67/28* (2013.01)

(58) Field of Classification Search
  CPC ....... H04L 45/38; H04L 45/44; H04L 45/745; H04L 63/166; H04L 67/28
  USPC ........................................................ 709/238
  See application file for complete search history.

(56) References Cited

U.S. PATENT DOCUMENTS

| | | | |
|---|---|---|---|
| 6,760,775 B1 * | 7/2004 | Anerousis | H04L 29/06 709/229 |
| 6,798,775 B1 * | 9/2004 | Bordonaro | H04L 12/4641 370/392 |
| 8,990,430 B2 * | 3/2015 | Smith | H04L 45/586 709/249 |
| 9,239,738 B2 * | 1/2016 | Hegde | G06F 9/5027 |
| 9,668,161 B2 * | 5/2017 | Kavunder | H04W 28/0215 |
| 10,257,167 B1 * | 4/2019 | Matthews | H04L 12/4641 |
| 10,623,308 B2 * | 4/2020 | Singh | H04L 45/38 |
| 2004/0210670 A1 * | 10/2004 | Anerousis | H04L 61/35 709/238 |
| 2017/0359258 A1 * | 12/2017 | Flanagan | H04L 45/74 |
| 2018/0241664 A1 * | 8/2018 | Singh | H04L 63/105 |
| 2019/0149587 A1 * | 5/2019 | Klaghofer | H04L 65/80 709/219 |

* cited by examiner

*Primary Examiner* — Moustafa M Meky
(74) *Attorney, Agent, or Firm* — Knobbe, Martens, Olson & Bear, LLP

(57) ABSTRACT

Systems and methods are provided to add flow identification information to packets of network traffic. Each packet can have flow identification information added based on the packet being sent to a full-proxy mode appliance. A stateful network routing service may intercept packets and determine the packets are to be sent to a full-proxy mode appliance. Based on this determination, the stateful network routing service may obtain or generate flow identification information to identify the packet. The stateful network routing service may add the information to the packet and transmit the enriched packet to a full-proxy mode network appliance. The stateful network routing service may receive a second enriched packet from the network appliance. The stateful network routing service can parse the second enriched packet for flow identification information and identify the second enriched packet based on the flow identification information.

20 Claims, 14 Drawing Sheets

CORRELATING NETWORK FLOWS IN A ROUTING SERVICE FOR FULL-PROXY NETWORK APPLIANCES

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

Somewhat similar, network virtualization technologies exist that allow for creation of virtualized network environments at a virtualization host computing device, or on multiple virtualization host computing devices connected via a physical substrate network. Virtualized network environments can operate in a manner logical similar or equivalent to a corresponding physical network, but may be created, maintained, deleted, or otherwise managed via software. Moreover, a single virtualization host device or physical substrate network can host multiple virtualized network environments.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
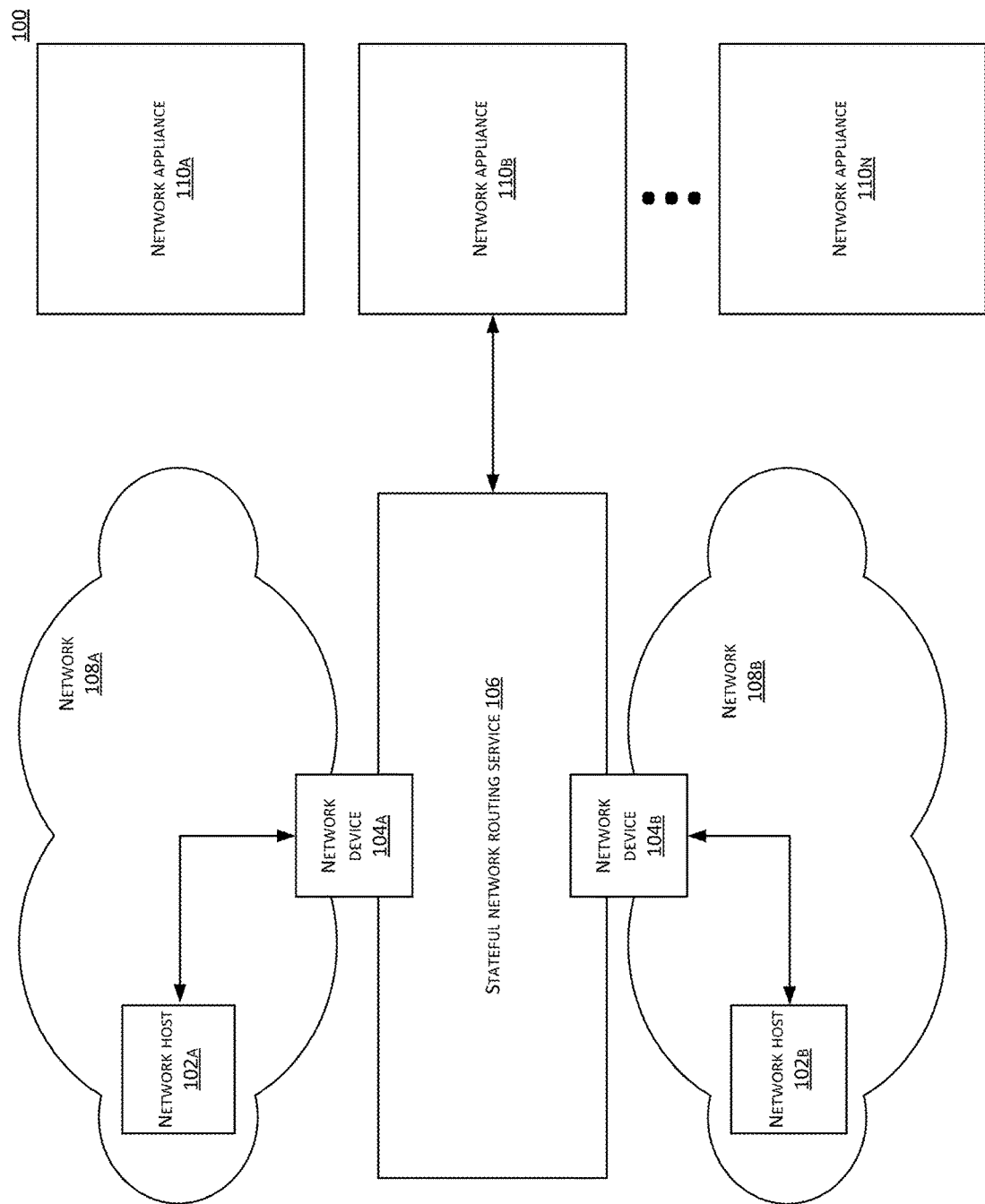
FIG. 1 depicts a schematic diagram of an example networked environment according to some embodiments.

The present disclosure generally relates to a managed service that makes it easy for customers of a cloud provider network to deploy, manage, and use a fleet of virtual network appliances in a scalable, secure, and fault-tolerant manner. For example, the fleet of virtual network appliances may be horizontally scalable. Customers may insert such network appliances inline, such that traffic flowing from a source to a destination flows through the network appliance. Such network appliances can perform actions such as security inspection, compliance, policy controls, and other networking services. Typically, such network appliances do not scale and do not support high availability beyond a single availability zone, and can involve complexity that increases the possibility of errors, accidental exfiltration of sensitive data, and inbound security attacks. Existing network appliances can also introduce a single point of failure into network traffic flows. Additionally, the insertion of network appliances can increase memory demands. The disclosed managed appliance gateway service addresses these challenges, among others, by (1) enabling user-defined arbitrary routing decisions, (2) providing flexible and elastic routing of network traffic, (3) providing secure managed traffic steering to maintain security boundaries when a network appliance is operating in full proxy mode, (4) providing stateful routing of traffic with a stateless network routing service, and (5) providing secure managed traffic steering to maintain boundaries between availability zones. Implementations of the managed appliance gateway service may process per packet at layer 3 (of the open systems interconnection (OSI) model) in a manner agnostic to appliance states, so that any type of third-party network appliance can be deployed in the fleet behind the appliance gateway. In this manner, the appliance gateway can act as a combination of a layer 3 router and layer 4 load balancer.

Aspects relate to providing and managing access to network appliances for virtualized network environments, which appliances provide networking services to network hosts in those virtualized network environments (these environments to which services are provided by a network appliance are generally referred to herein as "serviced environments"), where the network appliances exist external to such serviced environments. More specifically, as disclosed herein, managing access to a network appliance external to serviced environments can enable appliances to service traffic from multiple addresses, such that a single network appliance provides services to multiple distinct addresses associated with a particular serviced environment. The embodiments described herein can provide for efficient, resilient and secure routing of traffic for serviced environments, by providing a stateful network routing service that obtains traffic stemming from or addressed to a serviced environment and routes such traffic to an appropriate network appliance.

When routing such data, the stateful network routing service can utilize network virtualization technologies to ensure that such routing occurs transparently to the serviced environment, without interfering with normal network communications. To support use of such virtualization technologies, the stateful network routing service can maintain state data identifying particular "flows" of traffic through the routings service, each of which generally represents a related set of traffic (e.g., sharing a source network address; a destination network address; a source port, a destination port, and a protocol). Further, by using the flows of traffic, the stateful network routing service can load balance the traffic across multiple network appliances. The stateful network routing service can maintain load balancing information in a data store linking a particular flow of traffic to a particular appliance for processing, such that subsequent packets of network traffic corresponding to the same flow will be routed to the same appliance prior to being routed to the intended destination. Further, the stateful network routing service may route a first packet of a first flow of traffic to a first appliance and a second packet of a second flow of traffic to a second appliance.

For example, assume a flow exists between a first device within a serviced environment and a second device external to the serviced environment. Further assume that all traffic of this flow is to be rerouted to a particular network appliance selected by the stateful network routing service. The stateful network routing service may select the network appliance for the flow based on information associated with the particular flow. The stateful network routing service may therefore maintain information that states that traffic from the first device to the second device should be routed by the stateful network routing service to the particular network appliance. This information may be stated in terms of the related set of traffic and the particular network appliance, in the form of "source_ip,destination_ip,source_port,destination_port,protocol=>network_appliance", where "source_ip" is the network address from which the packet is received, "destination ip" is the address to which the packet is addressed, "source_port" is the port from which the packet is received, "destination_port" is the port to which the packet is addressed, and "protocol" is the type of packet being used. As such, information stating that traffic, using a first protocol, from the first port of the first device to the second port of the second device should be routed from the stateful network routing service to the network appliance may be phrased as "first_device,second_device,first_port, second_port,first_protocol=>network_appliance." While these rules are explained in terms of original and new source and destination addresses, source and destination ports, and a protocol, for the sake of simplicity, in practice more or less parameters may be used to define either original or rewritten values, including (but not limited to) class of service. A combination of such parameters may in some instances be referred to as a "tuple." As such, the information stored by the stateful network routing service may be defined as "tuple=>network_appliance," such that incoming packets that match "tuple" are to be routed to "network_appliance" In some instances, encapsulation may be used such that the original tuple is maintained within an encapsulated packet header with the encapsulated packet being routed the network appliance.

In some cases, the amount of load balancing information to manage flows by the stateful network routing service may be large. For example, the stateful routing service may service thousands, tens of thousands, etc., flows and thus be required to store a significant number of routing rules. This requirement may be exacerbated by the fact that each logical communication path associated with a particular source device (e.g., each communication path between the source device and a different destination device or each communication path from the source device but a different source port) may in fact be represented by a unique flow: a flow for each unique combination. As a result, the stateful network routing service may manage, for each source device, a number of unique flows associated with the source device and a number of corresponding network appliances, potentially overloading memory requirements of the network routing service. In addition, the stateful network routing service may receive a flow of traffic that does not contain certain information such a source address or a destination address and thus the stateful network routing service may drop the traffic resulting in the potential loss of data.

In accordance with embodiments of the present disclosure, the amount of load balancing information required by a stateful network routing service may be reduced by using custom defined tuples. More particularly, and as discussed in more detail below, prior to a network routing service assigning network appliances for flows of network traffic (e.g., load balancing traffic across the network appliances), the network routing service may receive an arbitrary definition of a tuple that defines what constitutes a particular "flow" for purposes of making routing decisions (e.g., how network appliances are selected for the flows of traffic). The arbitrary definition of the tuple enables the network routing service to ignore certain parameters associated with the traffic and base the load balancing decision on arbitrarily defined parameters. For example, a user of the network routing service may provide the tuple definition to the network routing service, the tuple definition designating a specific combination of parameters that constitute a tuple such as one or more of source address, destination address, source port, destination port, protocol, etc. To increase tuple flexibility and allow the network routing service to accommodate all types of traffic, while decreasing the amount of memory consumed by the network routing service, the network routing service can receive the custom tuple definition and use the definition in mapping flows to network appliances.

Accordingly, the network routing service parses each packet of network traffic based on the custom tuple definition to determine a network appliance that the particular packet of network traffic is to be routed. For example, the custom tuple definition may designate one or more fields of the packet that should be used for identifying a flow of traffic. The network routing service may ignore fields of the packet that are not included in the custom tuple definition and extract, from the packet, the one or more fields included in the custom tuple definition. As such, the network routing service identify distinct flows based on the custom tuple definition, and route traffic to network appliances in accordance with those identified flows. Rather than identifying flows based on a pre-defined and fixed tuple (e.g., a "5-tuple" of source address, destination address, source port, destination port, and protocol), the use of custom tuple definitions allows a user of the network routing service to arbitrarily define how network appliances are mapped to flows of traffic, thereby adjusting the number of network appliances that are required in a particular system. For example, the custom tuple definition may be based on "source address" such that each packet originating from the same source address is to be routed to the same network appliance, greatly reducing the number of resources used at the network routing service as packets corresponding to multiple, distinct destinations may correspond to the same flow definition. This decreases the amount of memory used by the network routing service and reduces the amount of state synchronization required between network routing services. Additionally, routing packets based on fewer fields may allow more accurate load balancing by reducing the granularity of a flow definition. The custom tuple definition may provide specific bits of the packet that should be used in selecting a network appliance. Further, the use of custom tuple definitions allows the user to provide tuple definitions that are based on fields that are not ordinarily used. For example, custom tuple definitions can capture rare fields that are not commonly used or currently undefined fields in packets of network traffic. The stateful routing service may then rely on additional fields of the packet to route the packet to a determined network appliance. As such, the amount of load balancing information stored at the network routing service can be significantly reduced.

As discussed above, appliances in accordance with embodiments of the present disclosure can service traffic associated with a large number of addresses associated with a serviced environment and it may be advantageous to reduce the number of addresses associated with the serviced environment. In order to reduce the number of logical addresses associated with a serviced environment, an appliance may implement network address translation such that the large number of addresses are reduced or translated to a smaller or more manageable number of addresses. Further, the privacy of information in the serviced environment may be of the utmost importance, and thus it may be advantageous for the appliance to establish separate connections (e.g., separate transmission control protocol (TCP) sessions, separate transport layer security (TLS) sessions, separate user datagram protocol (UDP) sessions, separate Hypertext Transfer Protocol (HTTP) sessions, etc.) (separate connections may include different parameters such as different sources, destinations, ports, etc.) between the serviced environment and the destination such that a connection between the environment and the appliance is separate and distinct from a connection between the appliance and the destination. For example, the appliance may receive a packet of traffic from the environment via a first connection, the appliance may terminate the first connection and perform one or more operations on the traffic, the appliance may then send the packet of traffic to the destination via a second connection. Such a use of the appliance may allow for information in the environment to be protected from third party attacks. In order to conduct network address translation and/or establish separate connections between the serviced environment and the destination, the appliance may implement a "full proxy mode" such that the appliance is an endpoint for traffic from the serviced environment and an originator for traffic to the destination. Further, the appliance may implement separate network stacks for the connection with the serviced environment and the connection with the destination. When an appliance is implementing a full proxy mode, the appliance may further perform additional security operations on the traffic. In some cases, as a result of the additional operations performed by the appliance, the stateful network routing service may have difficulty in correlating traffic sent to an appliance from the network routing service and corresponding traffic sent from the appliance to the network routing service. For example, the network routing service may route traffic to an appliance and receive corresponding traffic from the appliance. Due to the additional security operations performed by the appliance, the network routing service may not recognize the traffic received from the appliance and may drop the traffic.

In accordance with embodiments of the present disclosure, the stateful network routing service may use information regarding a specific packet to correlate and/or identify a packet received from an appliance implementing a full proxy mode. For example, the stateful network routing service may include, in a packet of traffic passed to a full proxy mode appliance, a randomly selected value corresponding to the flow as a flow identifier. As disclosed herein, such a flow identifier may be used to correlate to seemingly different flows (e.g., having a different set of values for a given tuple definition, due to operation of an appliance), such that the two seemingly different flows can in fact be identified as a single logical flow (e.g., a first portion representing traffic from a first party to an appliance acting as a proxy, and a second portion represent traffic from the proxy to a second party). More specifically, by use of a flow identifier, the stateful network routing service may ensure that any packets obtained from the full proxy mode appliance contain an issued flow identifier, thus ensuring that packets received from the full proxy mode appliance (e.g., as part of a second portion of a logical flow) are correlated to packets transmitted to the full proxy mode appliance (e.g., as part of a first portion of the logical flow). By providing for correlation of seemingly different flows into a single logical flow, security techniques implemented at the stateful network routing service, such as discarding of packets that stem from unknown parties and are not part of an existing flow, can be maintained even when appliances act as full proxies. Thus, security when using full proxy mode appliances may be increased. Further, the stateful network routing service can determine that an appliance is unavailable (e.g., the appliance has died, a connection with the appliance has timed out) and based on that determination, send a TCP reset to both the source and the destination of the packet. In some embodiments, the network appliance may use the flow identifier to identify the packet and based on the identification, bypass the stateful network routing service and send the packet directly to the destination. In some embodiments, the stateful network routing service may include a flow validator with the flow identifier, thus ensuring that the flow is identified as corresponding to the full proxy mode and is validated as corresponding to a specific flow of network traffic. Flow validators are described in more detail in U.S. patent application Ser. No. 16/917,804, entitled "Validating Network Flows in a Multi-Tenanted Network Appliance Routing Service" and filed 2020 Jun. 30 (the "'804 Application"), the entirety of which is incorporated by reference herein.

Because any computing system is subject to potential failure, providers of appliances may include multiple redundant appliances, any of which may be valid targets for receiving traffic from a serviced environment. A stateful network routing service as described herein may operate to obtain traffic from or to a serviced environment, identify an appropriate fleet of appliances to which the traffic should be routed, to select a given appliance from within that fleet to which to route the traffic, and to route that traffic to the selected appliance. The stateful network routing service may maintain appliance selection rules specifying how such selection occurs. For example, the stateful network routing service may apply load balancing techniques to select a given appliance. A routing rule may then be created based on the selected appliance, such as in the "tuple=>network appliance" format noted above. This rule may then be propagated among the stateful network routing service such that any packets matching the given tuple value (e.g., a hash of various header values, such as source internet protocol (IP), destination IP, source port, destination port, and protocol) is routed to the selected network appliance.

Due to the nature of operations conducted by appliances, it is often beneficial for the same appliance to monitor both directions of a given communication session. For example, in a communication session between two parties, party A and party B, it can be beneficial for a single appliance to intercept communications from party A to party B, as well as communications from party B to party A. In this way, the appliance has the full context of the session, as opposed to only half of that context. However, in some implementations of the appliance selection mechanism noted above, a stateful network routing service may operate to select different appliances for communications from party A to party B than to communications from party B to party A. Illustratively, assume that a tuple used to define a particular routing rule is {Source IP, Destination IP}, and that party A's IP address is "10.0.0.1", while party B's IP address is "10.0.1.1". In this instance, the tuple value for communications from party A to party B would be {10.0.0.1, 10.0.1.1}, while the tuple value for communications from party B to party A would be {10.0.1.1, 10.0.0.1}. As a result of these tuples being different, in some configurations the stateful network routing service may apply an appliance selection mechanism independently to each side of this communication session, resulting in each side of the session potentially being routed to a different appliance.

To address this concern, embodiments of the present disclosure can utilize direction-independent tuples, whereby paired source and destination values within a tuple are considered collectively, without regard to direction of communication. More particularly, because communication sessions are assumed to be symmetrical (with the source value for one half of a session representing the destination value for another half of the session), embodiments of the present disclosure can utilize tuples that disregard the "source" or "destination" characteristic of a particular value type (e.g., network address or port), and instead result in the same tuple value for both directions of a communication session. For example, the stateful network routing service as described herein may sort source and destination values of a particular value type, and utilize a tuple that depends on the sorted order of those values, rather than on their "source" or "destination" characteristic. Extending on the example above regarding a session between party A and party B, a tuple definition used to define the particular routing rule may then become {Lower IP, Higher IP}, where lower and higher are references to numerical sorting of source and destination IP addresses. In this example, any communications between party A and party B would have a tuple value of {10.0.0.1, 10.0.1.1}, and thus the same routing rule could be applied to all such communications, resulting in both directions of the session being routed to the same selected appliance.

Further complicating routing of traffic to appliances is the fact that in some configurations, a fleet of appliances may be distributed among multiple distinct networks. For example, a network environment for a set of appliances may include three sub-environments (e.g., sub-networks, or "subnets"). In some instances, each sub-environment may be logically or physically isolated from other sub-environments, such that failures that occur in one environment are unlikely or unable to cause failures in another environment. Each sub-environment may include a stateful network routing service operating in accordance with the present disclosure, again providing resiliency of operation. Further, each sub-environment may correspond to an availability zone, representing for example a physically and logically isolated set of computing devices. Additionally, the serviced environment may also correspond to an availability zone.

Due to the isolation between availability zones, it may generally be desirable for communications between two parties and an appliance (e.g., configured to intercept communications between the two parties) to occur within a single availability zone. For example, where two parties and an appliance fleet all operate within an availability zone, traffic between the two parties and the appliance fleet may be maintained within that zone, even if the two parties and appliance fleet also operate in other availability zones. Accordingly, a stateful network routing service may be configured with a default appliance selection rule, such as an appliance selection rule that specifies that traffic obtained from a device within a given availability zone is to be routed to an appliance (within an appropriate fleet) that is also within that availability zone, when possible.

While such a rule may result in the desired behavior in many instances, it may result in undesirable behavior in other instances. For example, while the stateful network routing service may operate to select an appliance to which to route a communication session between two parties, it may have limited or no ability to select the parties to that session. Where two parties to a communication session exist in different availability zones, the default selection rule noted above may result in the two halves of a communication session again being routed to different devices. For example, assume party A exists in zone A and party B exists in zone B. Under the default rule noted above, communications from party A may be routed to an appliance in zone A, while communications from party B may be routed to an appliance in zone B. Notably, this may occur even when the stateful network routing service implements direction-independent tuples, as the stateful network routing service may also be logically isolated between zones such that routing rules established in a first zone do not propagate to a second zone.

To address this concern, embodiments of the present disclosure can configure a stateful network routing service to utilize cross-zone routing rules, in which routing decisions made within a first availability zone are propagated across other availability zones. Extending the example above, a decision to route communications from party A to an appliance in zone A may be memorialized with a rule in the form of "direction-independent tuple of party A=>appliance", which rule is propagated to the computing devices implementing the stateful network routing service in other zones. On receiving a reply from party B in zone B, the service in that zone may calculate the direction-independent tuple of party B, which due to the symmetrical nature of the communication session is the same as the direction-independent tuple of party A. The service in zone B may thus use the already-memorialized routing rule to route the reply to the previously selected appliance, thus achieving direction-independent routing of traffic across availability zones.

In some embodiments, propagation of routing decisions (e.g., in the form of routing rules) between availability zones may be synchronous with respect to the packet for which a decision is made. For example, an initial packet from party A to party B may be delayed while a decision made with respect to that packet is propagated across zones. The significance of this delay is expected to be low, given that it occurs only when a decision is made (e.g., on the first packet). Moreover, synchronous replication of routing decisions can avoid race conditions, in which a reply packet from a second party is received at a device of the stateful routing network service (e.g., in a second zone) before that routing rule is obtained, potentially resulting in bifurcated routing of a single communication session. While embodiments are described herein with respect to cross-availability zone traffic, the embodiments described herein—including synchronous replication of routing rules using direction-independent tuples—may be applied to any distributed system implementing a stateful network routing service.

FIG. 1 illustrates an example environment 100 in which a stateful network routing service 106 may be implemented according to some embodiments, enabling traffic from serviced environments to be routed to network appliances 110. The stateful network routing service 106 may be referred to as an "appliance gateway" in some implementations. The example environment 100 may include one or more network hosts 102A, 102B (e.g., a source network host 102A and/or a destination network host 102B) that exist within distinct networks 108A and 108B (each a respective network environment), one or more network devices 104A and 104B, one or more network appliances 110A, 110B, . . . , 110N, and a stateful network routing service 106.

The environment 100 can be a cloud provider network (sometimes referred to simply as a "cloud"), which refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a virtual private network (VPN) or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services, such as the stateful network routing service 106, and which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts. Each network 108A and 108B illustratively represents a distinct network environment. In one embodiment, either or both networks 108A and 108B are virtualized networks logically implemented by a physical network referred to as the substrate, which includes physical network hardware such as routers, switches, network address translators (NATs), and so on, as well as the physical connections among the devices. For example, either or both networks 108A and 108B may represent a virtual private network environment (or "VPE"). Generally described, a VPE can represent a virtualized computing network (hosted by a host device or multiple host devices on a physical network) that enables devices connected (or "inside") the VPE to communicate as if they were connected to one another via a physical local area network (LAN). VPEs may in some instances be referred to as "virtual private clouds" ("VPCs"). A VPC is a custom-defined, virtual network within a cloud provider network. A VPC can provide the foundational network layer for a cloud service, for example a compute cloud or an edge cloud, or for a customer application or workload that runs on the cloud. A VPC can be defined by at least its address space, internal structure (e.g., the computing resources that comprise the VPC), and transit paths. A provider of the substrate network may enable users to configure and manage VPEs on the substrate network.

Each network 108A and 108B can logically include one or more hosts 102A, 102B, which represent computing devices operating within the network. Network hosts 102A, 102B may be physical devices, or logical devices implemented on underlying physical computing devices. For example, network hosts 102A, 102B may represent virtualized devices provided by a hosted computing environment, which may also be referred to as a "cloud computing environment." Such an environment can include a number of dynamically provisioned and released computing resources. Unless otherwise stated, the term "host" or "network host," as used herein, is intended to refer to a computer or computing device connected to and participating in a network, including servers and clients. For avoidance of ambiguity, it is noted that the term "host" may have other meanings in other contexts. For example, in the virtualization context, a "host device" may refer to an underlying (e.g., physical) computing device that implements a virtualized computing device. The present disclosure utilizes the terms "physical host" or "virtualization host" to refer to hosts in the virtualization context, to avoid ambiguity. Accordingly, general reference to a "host" should be understood to refer to a network host, and not necessarily to a physical computing device or virtualization host. Nevertheless, it is recognized that a virtualization host may represent a network host, and vice versa.

To enable communications between networks 108A and 108B (or to other networks not shown in FIG. 1, such as a wide area network (WAN) or global area network (GAN) like the Internet), each network 108A and 108B includes a network device 112A and 112B respectively that acts as a gateway for the network 108A and 108B to the stateful network routing service 106. Accordingly, hosts 102A, 102B may send data (e.g., in the form of packets) to the network device 112A, 112B of their network 108A and 108B, in order for that data to be routed to an appropriate destination. Illustratively, an administrator of a network 108A and 108B may configure the device 112A, 112B such that traffic executing the network is directed to the stateful network routing service 106 for processing by an appliance 110A, 110B, . . . , 110N external to the network 108A and 108B.

Embodiments of the present disclosure enable traffic from networks 108A and 108B to be routed to a fleet of network appliances 110, shown in FIG. 1 as appliances 110, external to the networks 108A and B. These appliances 110 may provide the same functionalities described above, but remove a need for an administrator, owner, or operator of the networks 108 to create, manage, and maintain such appliances 110. Moreover, by providing appliances 110 external to the networks 108, these appliances 110 may be multi-tenanted, enabling a single appliance 110 to provide a given functionality to multiple networks 108 associated with multiple owners. As such, the efficiency of operation of an appliance 110 can increase relative to a traditional configuration.

The network appliances 110 may perform various functions, such as monitoring, firewalling, filtering, malware scanning, and so forth. In one example, the network appliances 110 may perform the same function and may be replicated as needed to achieve scaling based on traffic volume. In other examples, various network appliances 110 may perform different functions, and the stateful network routing service 106 may route network traffic through multiple network appliances 110 that perform different desired functions. In some implementations, multiple instances of the stateful network routing service 106 may be deployed serially or in a stacked configuration, with each instance of the stateful network routing service 106 routing traffic to and from different groupings of network appliances 110, where respective groupings perform different functions. The network appliances 110 may operate transparently in a "bump-in-the-wire" mode. Alternatively, the network appliances 110 may be full-proxy mode network appliances and may perform one or more full-proxy mode operations such as network address translation, transport layer security termination, or protocol translation. The network appliances 110 may perform the various functions on each packet of traffic received from the stateful network routing service 106.

As a result of performing corresponding functions, the network appliances 110 may determine whether to forward or drop a packet. The network appliances may forward (e.g., allow) a packet in order to send the packet to its destination network host. The network appliances 110 may inspect the packet and allow the packet to proceed on to the destination network host without making changes to the content of the packet. In some embodiments, the network appliances 110 may not allow (e.g., drop) the packet in order to prevent the packet from being sent to the destination network host. For example, if the network appliances 110 are a firewall, the packet may be dropped based at least in part on a pre-defined policy and the packet may be discarded the network appliances 110. Further, in other embodiments, the network appliance may act as a secure sockets layer which may result in two separate flows of network traffic (e.g., a first flow between the source network host and the appliance on the front end and a second flow between the appliance and the destination network host on the back end.) For example, a first packet may be sent to the network appliance corresponding to the first flow and a second packet may be sent from the network appliance corresponding to the second flow. As a result, the network appliances 110 may determine a transmission decision for packets.

To facilitate routing of traffic from networks 108A and 108B to appliances 110, the stateful network routing service 106 may maintain routing rules. For example, the routing service 106 may associate an incoming packet with a specific routing rule that states that traffic from the network host 102A to the network host 102B device should be routed from the routing service 106 to a network appliance 110. The routing rule may be used by the stateful network routing service 106 to determine a network appliance 110 that the packet should be transmitted to. The stateful network routing service 106 may receive a corresponding packet from the network appliance 110 and determine a source and a destination of the packet based at least in part on decapsulating the packet. For example, decapsulating the packet may include removing an outer header of the packet and the source and destination of the packet may correspond to an inner header of the packet. Further, the stateful network routing service 106 may validate the packet based on the routing rule. Therefore, the routing rule may be used by the stateful network routing service to transmit traffic from the network host 102A to the network host 102B through the network appliance.

In order to route the packets, the stateful network routing service 106 may determine a network appliance to which to route the packets. The stateful network routing service 106 may determine that the packet should be transmitted to a fleet of network appliances 110 on values of a packet header of the packet. The packet header may indicate that the packets should be routed to a particular fleet of appliances 110 prior to transmission to the destination. A network appliance of the fleet of network appliances 110 may be selected through a flow hashing approach designed to approximately equally distribute network traffic among the fleet of network appliances 110 that perform a replicated function. Other approaches to selection may be used, including time-based selection approaches or selection approaches that monitor throughput data rate, processor load, connection quantities, availability zone affinity, and/or other metrics pertaining to the fleet of network appliances 110 and attempt to assign flows based at least in part on one or more of these metrics in an equitable manner. Through these approaches, the stateful network routing service 106 may determine a network appliance of the fleet of network appliances 110 to route the packets.

As noted above, the stateful network routing service 106 may determine a network appliance of the fleet of network appliances 110 to route a given packet. The stateful network routing service 106 may memorialize the selection of the appliance as a routing rule, stored by the stateful network routing service 106, indicating that the packet and packets associated with the packet are to be routed to a specific network appliance based on values of the packet. In order to identify whether a given packet should be routed to the specific network appliance, the stateful network routing service 106 may parse the header of a given packet for certain fields based on a tuple definition that indicates the fields of a packet that should be used for routing decisions. Further, packets that share the same values for these fields (i.e., a tuple value) may be routed to the same network appliance. Each packet that shares the same values for the particular fields may further correspond to the same flow of network traffic. As illustrated in this non-limiting example, the stateful network routing service 106 selects network appliance 110B to route the data packets for the particular flow of network traffic. The stateful network routing service 106 may select different network appliances 110 for different flows. The data packets may correspond to a network data connection that is a bidirectional data flow, such as through a single TCP or UDP connection. The stateful network routing service 106 may provide that a corresponding related and/or return data flow is routed through the same network appliance 110B as a corresponding forward data flow. Related data may include error messages, including Internet control message protocol (ICMP) messages. Such an approach to assignment may be required for the network appliance 110 to properly perform its processing functions, even if the other network appliances 110 can perform the same functions.

As noted above, to facilitate routing of traffic from network host 102A, 102B to a network appliance, the network device 104A, 104B may parse the traffic in order to determine flow information associated with a particular packet of traffic. The flow information may correspond to one or more field values of a given packet. In order to monitor a bidirectional flow of network traffic, the tuple value may be a direction agnostic tuple value. The direction agnostic tuple value may include one or more field values that are stored as groups of data (e.g., IP addresses, ports, protocol, etc.) and may not include directional information (e.g., source, or destination). Further, the groups of data may be stored based on certain characteristics such as lowest to highest, highest to lowest, etc. For example, the network device 104A may store IP addresses based on small to large IP addresses and may not include information differentiating source IP addresses and destination IP addresses. The network devices 104A, 104B may further each maintain local memory, in the associated availability zones, storing the determined routing rule for a specific direction agnostic tuple value. For example, the network device 104A, 104B may associate a direction agnostic tuple value with a specific network appliance. Therefore, the network device 104A, 104B ensures that a bidirectional flow of network traffic is associated with a direction agnostic tuple value linked to a specific network appliance.

In order to route the packets, the network device 104A, 104B and/or the stateful network routing service 106 may determine a network appliance 110. As illustrated in this non-limiting example, the network device 104A and the network device 104B route packets through the stateful network routing service 106 to the same network appliance 110. The data packets from the network device 104A and the network device 104B may correspond to a network data connection that is a bidirectional data flow, such as through a single TCP or UDP connection. The network device 104A, 104B may provide that a corresponding related and/or return data flow is routed through the same instance of the stateful network routing service 106 as a corresponding forward data flow. Related data may include a response. In order to ensure that the bidirectional flow of network traffic is routed to the same network appliance, the routing rule determined by network device 104A may be transmitted to other network devices (e.g., network device 104B) in other availability zones to achieve cross-zonal propagation of the routing rule. The network device 104A in a first availability zone may transmit the routing rule to network device 104B (or other destination, such as a flow data store) in a second availability zone synchronously during processing of a packet, thus ensuring replication prior to transmitting the packet to the selected network appliance. Further, the network device 104B may receive the packet and query an associated flow data store. Based on the routing rule provided by network device 104A, the network device 104B may route a packet to the same network appliance as the packet from the network device 104A such that the bidirectional flow of network traffic is routed to the same network appliance. In order to provide increased control over the selection of a given appliance, the stateful network routing service 106 may enable specification of a custom tuple definition for packets. The custom tuple definition may correspond to traffic from a particular serviced environment, network host, or the like. The custom tuple definition may identify fields or bit ranges, either predefined or custom, that the stateful network routing service 106 should use when determining a tuple value for a given packet. For example, a custom tuple definition may correspond to source IP address and packets that correspond to the custom tuple definition and share a source IP address may correspond to the same tuple value. Packets with the same tuple value may be routed to the same network appliance. The use of custom tuple definitions saves memory and speeds up processing by limiting the number of routing rules as the number of possible tuple values decrease. For example, a custom tuple definition that includes only source IP means may result in fewer routing rules to make and store, and new packets are far less likely to require a new load balancing decision.

In order to monitor traffic being transmitted to network appliances 110, the stateful network routing service 106 routes data on the network 108A and 108B to and from a fleet of network appliances 110 such that the stateful network routing service 106 controls the routing and forwarding of inbound and outbound traffic for the network appliances 110. The stateful network routing service 106 may verify that flow information (e.g., one or more field values) of a received packet corresponds to flow information of a transmitted packet. In some embodiments, the stateful network routing service 106 may monitor traffic by including flow identification information with the packet in order to ensure that traffic received from a full-proxy mode network appliance 110B is properly identified by the stateful network routing service 106. Based on the identification, the stateful network routing service 106 links packets that contain different flow information. In the event that the flow information of the received packet does not match the flow information of a transmitted packet, the stateful network routing service may determine whether the received packet includes flow identification information. Upon receipt of a packet from the network appliances with non-matching flow information, the stateful network routing service 106 may parse a packet received from the network appliances to determine if the packet contains flow identification information and use the flow identification information to identify the packet. In some embodiments, the stateful network routing service 106 may compare the flow identification information of the received packet with corresponding flow identification information stored in a flow data store of the stateful network routing service 106. Therefore, the stateful network routing service 106 may control the routing and forwarding of inbound and outbound traffic for the network appliances 110 based on the flow identification information.

In order to ensure that both halves of a bidirectional flow of network traffic are routed to the same network appliance 119, the network device 104A, 104B may determine a direction agnostic tuple value that is linked to a specific network appliance 110 based on receiving a packet corresponding to a first half of the bidirectional flow. The tuple value may be direction agnostic in that the tuple value includes groups of data but may not include directional data for the given data. Each network device 104A, 104B may be instantiated in a different availability zone. In order to ensure cross-zonal propagation, a routing rule linking the direction agnostic tuple value to a network appliance 110 may be provided to each network device 104A, 104B associated with the serviced environment. The routing rule may subsequently be stored in a data store local to each network device 104A, 104B (e.g., within the same availability zone). The network device 104A, 104B may receive a packet of network traffic corresponding to a second half of the bidirectional flow and determine a tuple value for the given packet. The network device 104A, 104B may subsequently query the data store for the tuple value and, based on the routing rule provided by another network device, may determine a network appliance 110 for the packet. As both halves of the bidirectional flow are routed to the same network appliance 110, the network device 104A, 104B may ensure that the same network appliance 110 is performing operations on packets of the bidirectional flow.

While the routing service 106 is shown in FIG. 1 as distinct from the appliances 110, in some embodiments the routing service 106 and appliances 110 may co-exist within a network (e.g., a logical network environment). In the example of FIG. 1, either or both the networks 108A and 108B may represent serviced environments.

Figure 2:
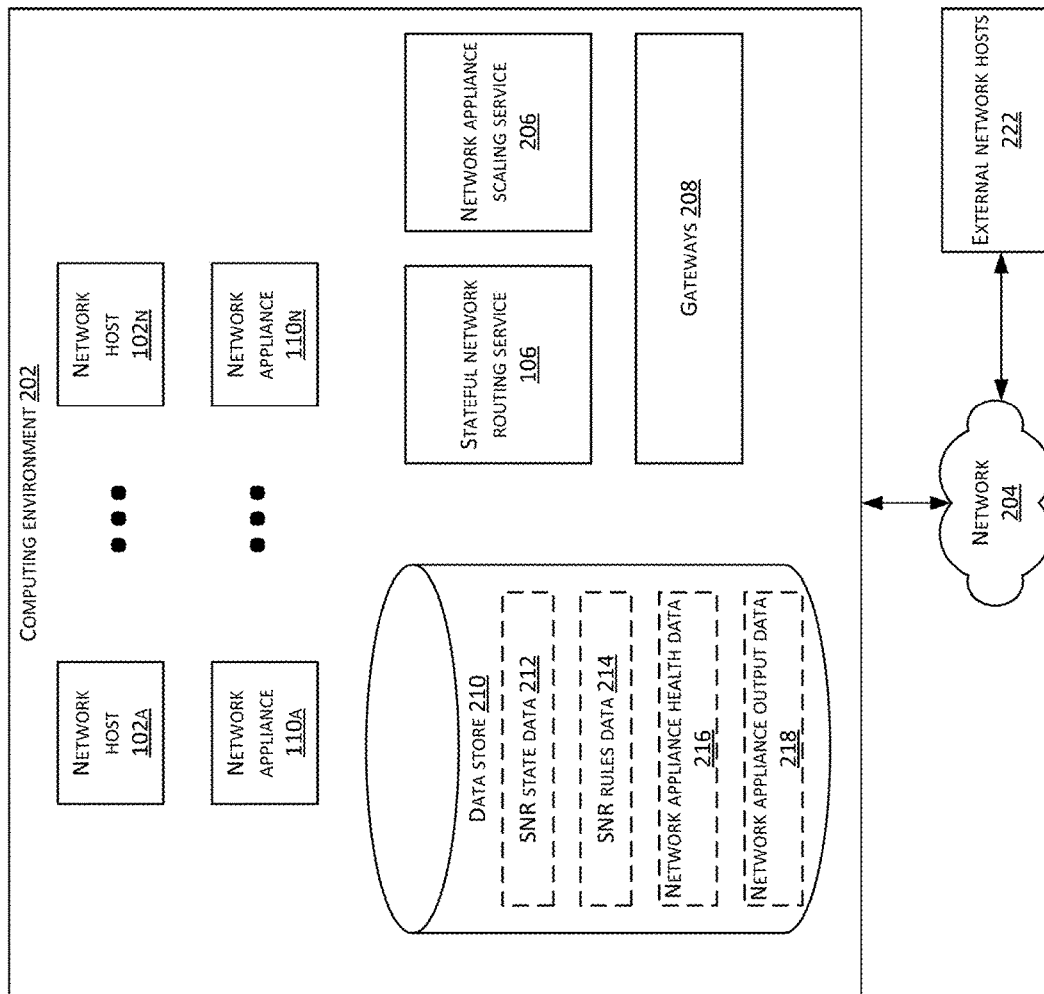
FIG. 2 depicts a schematic diagram of networked environments according to some embodiments.

FIG. 2 illustrates an example environment 200 according to various embodiments. The networked environment 200 includes a computing environment 202 and external network hosts 222, which are in data communication with each other via a network 204. The network 204 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 202 may comprise, for example, a server computer or any other system providing computing capability. Alternatively, the computing environment 202 may employ a plurality of computing devices that may be arranged, for example, in one or more server banks or computer banks or other arrangements. Such computing devices may be located in a single installation or may be distributed among many different geographical locations. For example, the computing environment 202 may include a plurality of computing devices that together may comprise a hosted computing resource, a grid computing resource, and/or any other distributed computing arrangement. In some cases, the computing environment 202 may correspond to an elastic computing resource where the allotted capacity of processing, network, storage, or other computing-related resources may vary over time. In one embodiment, the computing environment 202 corresponds to a virtual private network operated under a utility computing model on behalf of a customer with virtualized infrastructure.

The computing environment 202 may include various types of networking infrastructure to provide network connectivity to the respective components within the computing environment 202. Such networking infrastructure may include routers, switches, bridges, hubs, and a variety of physical links such as optical, twisted pair, coaxial, wireless, and so on. The networking infrastructure may employ data link layer protocols such as Ethernet, 802.11, token ring, etc., where respective components are assigned media access control (MAC) addresses. Internet protocol (IP) or other protocols may be used as a network layer protocol. The networking traffic within the computing environment 202 may be encrypted using internet protocol security (IPsec) or another approach and encapsulated using generic routing encapsulation (GRE) or another approach.

Various applications and/or other functionality may be executed in the computing environment 202 according to various embodiments. Also, various data is stored in a data store 210 that is accessible to the computing environment 202. The data store 210 may be representative of a plurality of data stores 210 as can be appreciated. The data stored in the data store 210, for example, is associated with the operation of the various applications and/or functional entities described below. In some embodiments, the data store 210 may be one or more flow data stores.

The components executed in the computing environment 202, for example, include a plurality of network hosts 102, a plurality of network appliances 110, one or more instances of the stateful network routing services 106, one or more network appliance scaling services 206, one or more gateways 208, and other applications, services, processes, systems, engines, or functionality not discussed in detail herein.

The network hosts 102 may correspond to network services such as web services, mail services, database services, media transcoding services, and/or other types of network services. Individual network hosts 102 may correspond to respective physical computing devices or virtualized machine instances executed on physical computing devices. In some cases, multiple network hosts 102 may be executed on a single virtualized machine instance having multiple virtual network gateways. Also, multiple virtualized machine instances may be executed on a single physical computing device, where the virtualized machine instances have separate virtual network gateways.

The network appliances 110 may correspond to specialized physical computing devices or customized virtualized machine instances executed on physical computing devices that perform specific processing functions on network data. Each network appliance 110 may have a respective inbound network gateway and a respective outbound network gateway, such that data packets are received via the inbound network gateway, processed, and then forwarded via the outbound network gateway. The processed data packets may simply be repeated by the network appliance 110, or they may be modified in some way or even dropped and not forwarded via the outbound network gateway. Because the network appliances 110 are surrounded by the stateful network routing service 106 that may guarantee that bidirectional and related flows are routed to the same network appliance 110, individual network appliances 110 may not be required to obtain state information such as connection or flow state information from other network appliances 110.

The stateful network routing service 106 is executed to route network traffic to and from a target, such as a bank of network appliances 110. Routing table rules may affect the network traffic that is routed through the stateful network routing service 106. For example, all network traffic within the computing environment 202 may be routed through the stateful network routing service 106. Alternatively, selected portions of network traffic may be routed through the stateful network routing service 106 based on source address, destination address, source port, destination port, protocol, application layer data, and/or other criteria. The stateful network routing service 106 may transparently intercept traffic between network hosts 102 in the computing environment 202 or traffic between network hosts 102 and external network hosts 222 via a gateway 208. The stateful network routing service 106 may transparently intercept all traffic within a subnet or within multiple subnets.

In one embodiment, in order to assign network data flows to particular network appliances 110, the stateful network routing service 106 may perform flow-based hashing. As a non-limiting example, the stateful network routing service 106 may examine the identifying header information for the data packets within a flow, potentially including source network address, destination network address, source port, destination port, and protocol type, and generate a hash value using a one-way hash function. The stateful network routing service 106 may then map the resulting hash value to a particular network appliance 110 so that the hash values are approximately evenly distributed among the network appliances 110 that perform a desired function. In generating the hash value, the stateful network routing service 106 may consider the source and destination data equivalently (e.g., by concatenating a lower value port to a higher value port rather than concatenating a source port to a destination port) so that the resulting hash value is the same when the source and destination are reversed. This achieves the desired result of assigning corresponding return flows to the same network appliance 110 as the forward flows.

In intercepting the traffic, the stateful network routing service 106 may maintain the same source and destination (e.g., source and destination network addresses and ports), and the stateful network routing service 106 may not show up as a network hop on a traceroute by not decrementing the time-to-live (TTL) field. In some cases, the stateful network routing service 106 may bridge data link layer traffic, thereby updating source and/or destination MAC addresses. In other cases, the MAC addresses are not modified. Even if the stateful network routing service 106 transparently intercepts the traffic, the network appliance 110 may be visible by modifying the data packets or by performing NAT or port address translation (PAT).

The stateful network routing service 106 may periodically, or in response to an event, perform health-checks upon the network appliances 110. In this regard, the stateful network routing service 106 may communicate with the network appliances 110 via simple network management protocol (SNMP) or another approach to query the state of the network appliances 110. Upon detection of a failure of a network appliance 110, the stateful network routing service 106 may reroute network traffic to a different network appliance 110 to avoid dropping a connection.

The network appliance scaling service 206 is executed to scale the quantity of the network appliances 110 up or down as needed to meet network traffic demands in the computing environment 202. To this end, the network appliance scaling service 206 may receive network utilization metrics from within the computing environment 202 and utilization information from the network appliances 110 to determine whether one or more network appliances 110 are unnecessary or if additional network appliances 110 should be deployed.

In scaling down, the network appliance scaling service 206 may terminate machine instances allocated to one or more network appliances 110 and/or reallocate network appliances 110 to other computing environments 202. In scaling up, the network appliance scaling service 206 may instantiate or launch new machine instances for new network appliances 110 or reallocate existing network appliances 110 to the computing environment 202. The scaling may be performed in response to user requests or automatically based upon the received metrics in combination with scaling rules and metric histories.

The gateways 208 are operable to route inbound traffic from the network 204 to respective entities within the computing environment 202 or outbound traffic from within the computing environment 202 to the network 204. The gateways 208 may perform NAT, for example, by transforming private network addresses to public network addresses. The gateways 208 may perform encryption and decryption as well as encapsulation and de-encapsulation functions.

The data stored in the data store 210 includes, for example, stateful network routing service state data 212, stateful network routing service rules data 214, network appliance health data 216, network appliance output data 218, and potentially other data. The stateful network routing service state data 212 tracks state information for network flows intercepted by the stateful network routing service 106. For example, the stateful network routing service state data 212 may record assignments of flows to particular network appliances 110. The stateful network routing service rules data 214 include rules that configure which network traffic within the computing environment 202 is routed to the stateful network routing service 106 for distribution to particular types of network appliances 110.

The network appliance health data 216 may include information about network appliance 110 health received by the stateful network routing service 106 as part of health checks. The network appliance output data 218 may include data generated by network appliances 110. Such data may include analytics data, logging data, malware detection data, firewall operations data, and/or other data.

Figure 3:
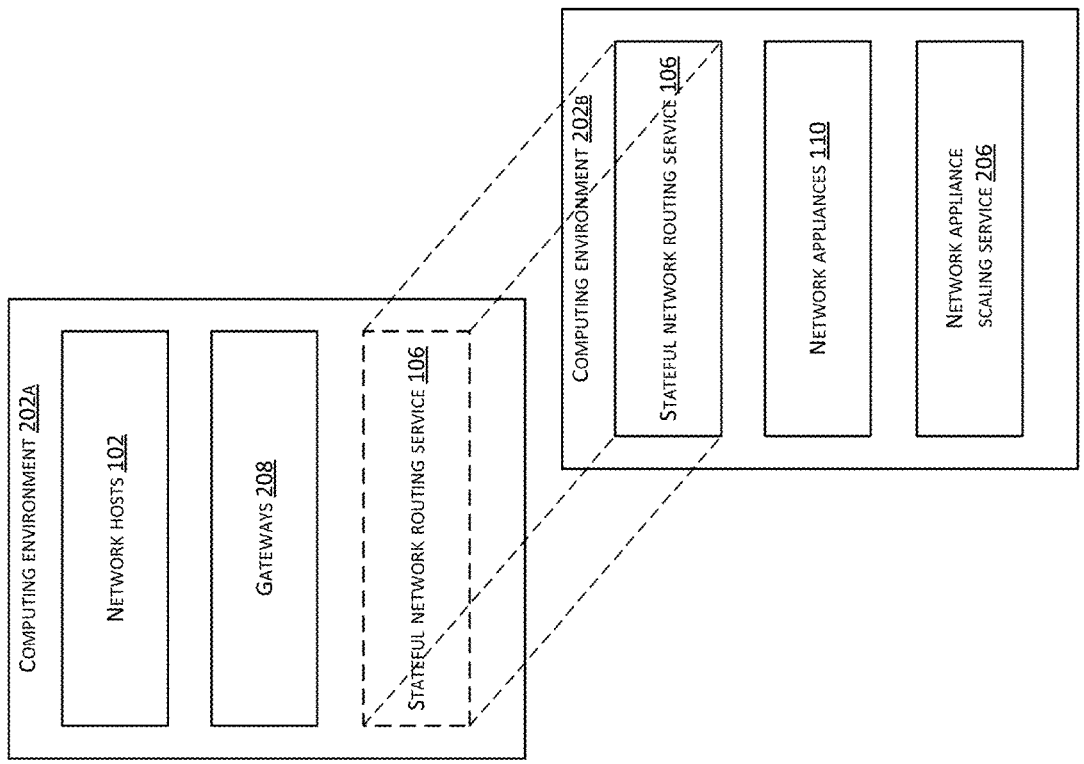
FIG. 3 depicts a schematic diagram of networked environments according to some embodiments.

FIG. 3 illustrates an example environment 300 illustrating an example configuration involving two computing environments 202A and 202B. The computing environments 202A and 202B may correspond to separate private networks or virtual private networks, which may be operated on behalf of different entities or users. The computing environment 202A includes network hosts 102 and gateways 208, along with a stateful network routing service 106. In some embodiments, the stateful network routing service 106 may be executed in the computing environment 202B. The stateful network routing service 106 may provide a virtual network gateway into the computing environment 202A in addition to a virtual network gateway into the computing environment 202B which permits it to intercept network traffic within the computing environment 202A and route it to network appliances 110 in the computing environment 202B. As an alternative, the stateful network routing service 106 may be implemented in the computing environment 202A, while the network appliances 110 implemented in the computing environment 202B may be given virtual network gateways in the computing environment 202A. The network appliance scaling service 206 may also be implemented in the computing environment 202B. The stateful network routing service 106 and/or the network appliances 110 may be operated as a service by a third party that operates the computing environment 202B. Access may be provided under a utility computing model, whereby the operator of the computing environment 202A pays for metered use of the network appliances 110 and/or the stateful network routing service 106. In another example, one or more network hosts 102 are also in a different computing environment 202 or network, and these network hosts 102 may be given virtual network gateways in the computing environment 202A and/or 202B. Further, the stateful network routing service 106 may be given a virtual network gateway into this different computing environment 202, which permits it to intercept network traffic within the different computing.

Figure 4A:
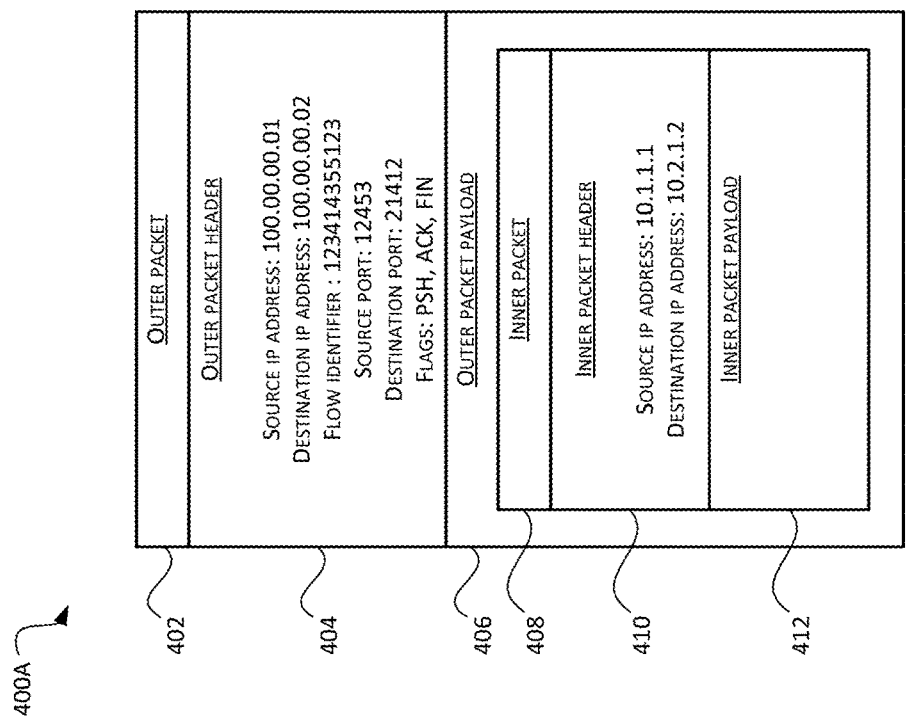
FIG. 4A is a pictorial diagram depicting an encapsulated packet in accordance with aspects of the present disclosure.

The stateful network routing service 106 can use encapsulation to transmit communications to an appliance. As noted above, in some embodiments, an appliance may operate in full proxy mode and thus it may be difficult for the stateful network routing service 106 to associate a first packet (e.g., a packet sent from the stateful network routing service 106 to the appliance) with a second packet (e.g., a packet received by the stateful network routing service 106 from the appliance) that in fact represent a logical flow between two network hosts. In accordance with aspects of the present disclosure, in order to identify two flows that represent the same logical flow, the stateful network routing service 106 may include, in an encapsulated packet header a flow identifier to facilitate correlation of the two flows by the stateful network routing service 106. FIG. 4A illustrates a pictorial diagram depicting an example encapsulated packet 400A in accordance with aspects of the present disclosure. The encapsulated packet 400A may correspond to a packet of active network traffic between a source network host and a destination network host that has flow identification information included within the packet. A stateless network routing service may generate the encapsulated packet 400A by encapsulating a corresponding packet and including, within the encapsulated packet, flow identification information. Further, the encapsulated packet 400A may also include other information such as an outer packet 402 and an inner packet 408, where the inner packet 408 corresponds to the packet prior to encapsulation. The outer packet 402 may include an outer packet header 404 and outer packet payload 406 and the inner packet 408 may include an inner packet header 410 and an inner packet payload 412. One or more layers or portions of the encapsulated packet 400A may correspond to control data and one or more layers of the encapsulated packet 400A may correspond to user data. In some embodiments, the encapsulated packet 400A may include additional fields or layers such as a user datagram protocol layer, an Ethernet layer, or a trivial file transfer protocol layer. One or more layers of the encapsulated packet 400A may correspond to layers added or information added via the encapsulation process.

The outer packet 402 may include an outer packet payload 406. The outer packet payload 406 may include an inner packet 408 that corresponds to an original packet of the encapsulated packet 400A prior to encapsulation. In some embodiments, the outer packet payload 406 may include additional information, The inner packet 408 may include an inner packet header 410. The inner packet header 410 may be added during the generation of the packet by the source virtualized computing environment. The inner packet header 410 may correspond to original IP information associated with the base packet of the encapsulated packet 400A. For example, prior to encapsulation, the packet may be generated by a source virtualized computing environment to be delivered to a destination virtualized computing environment and the inner packet header 410 may include a source IP address corresponding to the source virtualized computing environment and a destination IP address corresponding to the destination virtualized computing environment. Therefore, the inner packet header 410 may be included within the encapsulated packet in order to determine an original IP source and/or destination of the packet.

The inner packet 408 of the encapsulated packet 400A may also include an inner packet payload 412. The inner packet payload 412 may be added during generation of the packet by the source virtualized computing environment. The inner packet payload 412 may correspond to user data to be sent from the source virtualized computing environment to the destination virtualized computing environment. For example, the inner packet payload 412 may correspond to user communications, user commands, or other user data. The inner packet payload 412 may be generated by one or more applications associated with the source virtualized computing environment. In some embodiments, the size of the inner packet payload 412 may be limited by various network protocols. For example, the size of the inner packet payload 412 may be limited to a discrete number of bytes. Therefore, the inner packet payload 412 may include a plurality of information to be delivered to the destination virtualized computing environment.

In order to route the packet to a network appliance, the encapsulated packet 400A may include an outer packet header 404 that information enabling that routing, including a designation of a network appliance as a destination IP address of the packet and a designation of the stateless network routing service as a source IP address of the packet. The outer packet header 404 may be added during the encapsulation of the packet. In some embodiments, the outer packet header 404 may be added to every packet that is encapsulated. In some embodiments, the outer packet header 404 may include one or more fields corresponding to an encapsulation protocol such as Generic Network Virtualization Encapsulation ("GENEVE"), Virtual Extensible LAN ("VXLAN"), Network Virtualization using Generic Routing Encapsulation ("NVGRE"), or Stateless Transport Tunneling ("STT"). Therefore, the outer packet header 404 may be included within the encapsulated packet as one or more layers of the packet.

The outer packet header 404 may include information associated with the outer packet 402 in order to assist in routing the encapsulated packet 400A. For example, the outer packet header 404 may include a designation of one or more of a flow identifier, a source port, a destination port, or flags. The outer packet header 404 may further include additional packet information. The additional packet information may correspond to TCP information associated with the outer packet 402. In the example of FIG. 4A, the outer packet header 404 include field values for each of a source IP address, a destination IP address, a flow identifier, a source port, a destination port, and one or more flags.

When a stateful network routing service 106 determines that a packet is to be sent to a full-proxy network appliance, the stateful network routing service 106 may add flow identification information to the outer packet header 404. The stateful network routing service 106 may add the flow identification information during the encapsulation of the packet for subsequent correlation of two seemingly different flows of network traffic that each correspond to the same proxied communication session. In some embodiments, flow identification information may be added by other devices such as a network device in communication with a network host, or packets may include the flow identification information in other layers of the packet such as the outer packet payload 406. The outer packet header 404 may include one or more fields of flow identification information. The one or more fields of flow identification information may include one or more of a flow identification flag, flow identification number, or other flow identification information. The flow identification flag may be a flag, identifier, tag, word string, or other indication that the encapsulated packet 400A has been encapsulated with flow identification information. The flow identification number may be a number, word string, tag, randomly generated string, or alphanumerical string corresponding to the flow of network traffic. The outer packet header 404 may therefore include flow identification information and an identifier that the flow identification information has been included.

The stateful network routing service 106 may add the flow identification information to the outer packet header 404 and transmit the packet to a corresponding network appliance. Based on transmitting the packet to the network appliance, the stateful network routing service 106 may expect a packet in response to the transmitted packet. The flow identification information may be necessary to identify the responsive packet as the responsive packet. Specifically, full-proxy network appliance may perform one or more full-proxy operations that result in the modification of the inner packet header 410. After modification of the inner packet header 410, a responsive packet with the modified inner packet header 410 may be sent to the stateful network routing service 106. Based on the modified inner packet header 410, the stateful network routing service 106 may determine that the inner header values of the responsive packet does not correspond to expected values. Further, as a network appliance may handle packets from multiple flows of network traffic, the stateful network routing service 106 may determine that the responsive packet corresponds to a different flow from the transmitted packet. However, the inclusion of the flow identifier allows for the stateful network routing service 106 to associate the responsive packet and the packet with a singular proxied communication session.

The stateful network routing service 106 may receive a responsive packet and determine the responsive packet has been encapsulated with flow identification information based on the flow identification flag. The stateful network routing service 106 may identify a flow identification flag or flow identification number from the outer packet header 404. For example, a flow identification number "0001" may be used to identify a particular flow from a first network host to the network appliance as one-half of a two-part logical flow (the other half of the two-part logical flow may correspond to a flow from the network appliance to a second network host). The flow identification number may further identify that a particular packet has been transmitted by a full proxy mode network appliance. Therefore, by determining that the packet contains the flow identification number, the stateful network routing service 106 can identify that the packet is a responsive packet received in response to a particular packet sent to the appliance. Further, by identifying that the packet is a responsive packet, the stateful network routing service 106 can determine that packets with different field values within the corresponding inner packet header 410 correspond to the same logical flow.

Figure 4B:
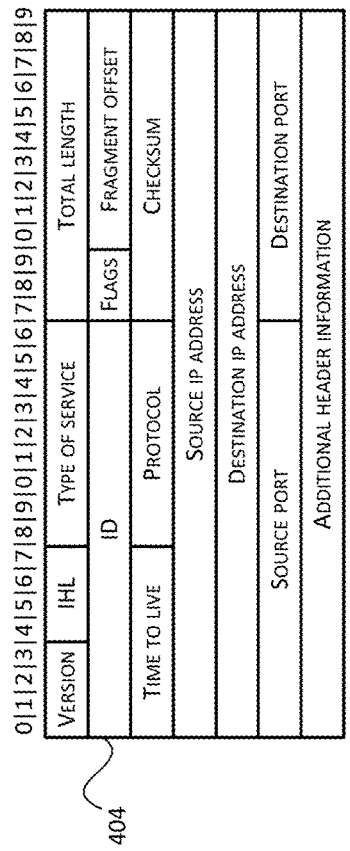
FIG. 4B is a pictorial diagram depicting a header of an encapsulated packet in accordance with aspects of the present disclosure.

FIG. 4B illustrates a pictorial diagram depicting an example packet header 400B of an example encapsulated packet in accordance with aspects of the present disclosure. Illustratively, the example packet header 400B can be an inner packet header 410 of the encapsulated packet 400A. The information included within the packet header 400B may correspond to one or more fields that are used to identify a particular packet. Therefore, the packet header 400B can correspond to one or more fields that may be used to identify various information associated with the packet.

The packet header 400B may include a plurality of field values. Each field value may correspond to a particular field. For example, the packet header 400B may include a field "source port" and a field value "12453." In some implementations, the packet header 400B may not include certain fields. For example, the packet header may not include a "source port" field or a "destination port" field. Further, the number of fields within a certain packet may depend on the protocol being implemented with respect to the particular packet.

The plurality of field values may be separated within the packet header 400B. In some implementations, the plurality of field values may correspond to certain bit ranges. For example, a given field value may correspond to a given range of bits within the packet header 400B. Further, a first field value may correspond to a first row and bits zero through three, a second field value may correspond to a first row and bits four through seven, etc. In other implementations, the plurality of field values may correspond to certain associated fields. For example, a given field may correspond to "source port" and a given field value "12453." In order to determine a particular field value, the packet header 400B may be parsed based upon bit ranges, the one or more fields, or other packet information. Therefore, the packet header 400B may be parsed to identify certain field values of the packet.

In the example of FIG. 4B, the packet header 400B includes a plurality of field values. Each field value may be identified based upon a row and a range of bits or based on an associated field. For example, the plurality of field values includes a field value that corresponds to row one and bits zero through three and corresponds to a field "version." One or more of the bit range and the field may be used to identify a particular field value. In the example of FIG. 4B, the plurality of field values includes field values for rows one through eight and thirty bits. Further, the plurality of field values include field values that correspond to the fields "version," internet header length ("IHL")," "type of service," "total length," identifier ("ID"), "flags," "fragment offset," "time to live," "protocol," "checksum," "source IP address," "destination IP address," "source port," "destination port," and "additional header information." In some embodiments, more or less fields may be included in the packet header 400B. Therefore, the packet header 400B may include any number of field values that are used to identify a particular packet and a particular flow of network traffic.

A communicating network host can define custom tuple definitions in order to identify packets that relate to a given flow of network traffic. Further, the custom tuple definitions may be used to identify particular flows of network traffic that may be used to determine a network appliance that the packet should be routed. The custom tuple definition further allows for load balancing of a given flow. The communicating network host can provide the custom tuple definition such that a stateless network routing service can determine a subset of the fields from the packet header 400B (e.g., a tuple value) for a given packet. The stateful network routing service may determine that the packet corresponds to a custom tuple definition based on flow information of the packet (e.g., the source IP address of the packet, the packet stemming from a particular serviced environment, etc.). Based on the subset of fields identified by the custom tuple definition, a subset of field values from the packet header 400B may be used to generate a tuple value for the packet for routing packets to an appliance and load balancing a flow. For example, a tuple definition may include a field value located in row one, bits four through seven. Further, a tuple definition may include a field value corresponding to a "source port" field. The custom tuple definition enables a network host to customize what tuple is used for routing which can save memory and increase processing speed as a number of stored routing rules would be reduced as the number of possible tuple values decreases. For example, by using a custom tuple definition that uses only source IP address, fewer routing rules will be decreased as the number of different possible source IP addresses is less than the number of different possible combinations of source IP address, destination IP address, source port, destination port, and protocol for a custom tuple definition that uses each of these fields. Thus, new packets are less likely to warrant a new load balancing decision when using the custom tuple definition.

Figure 5:
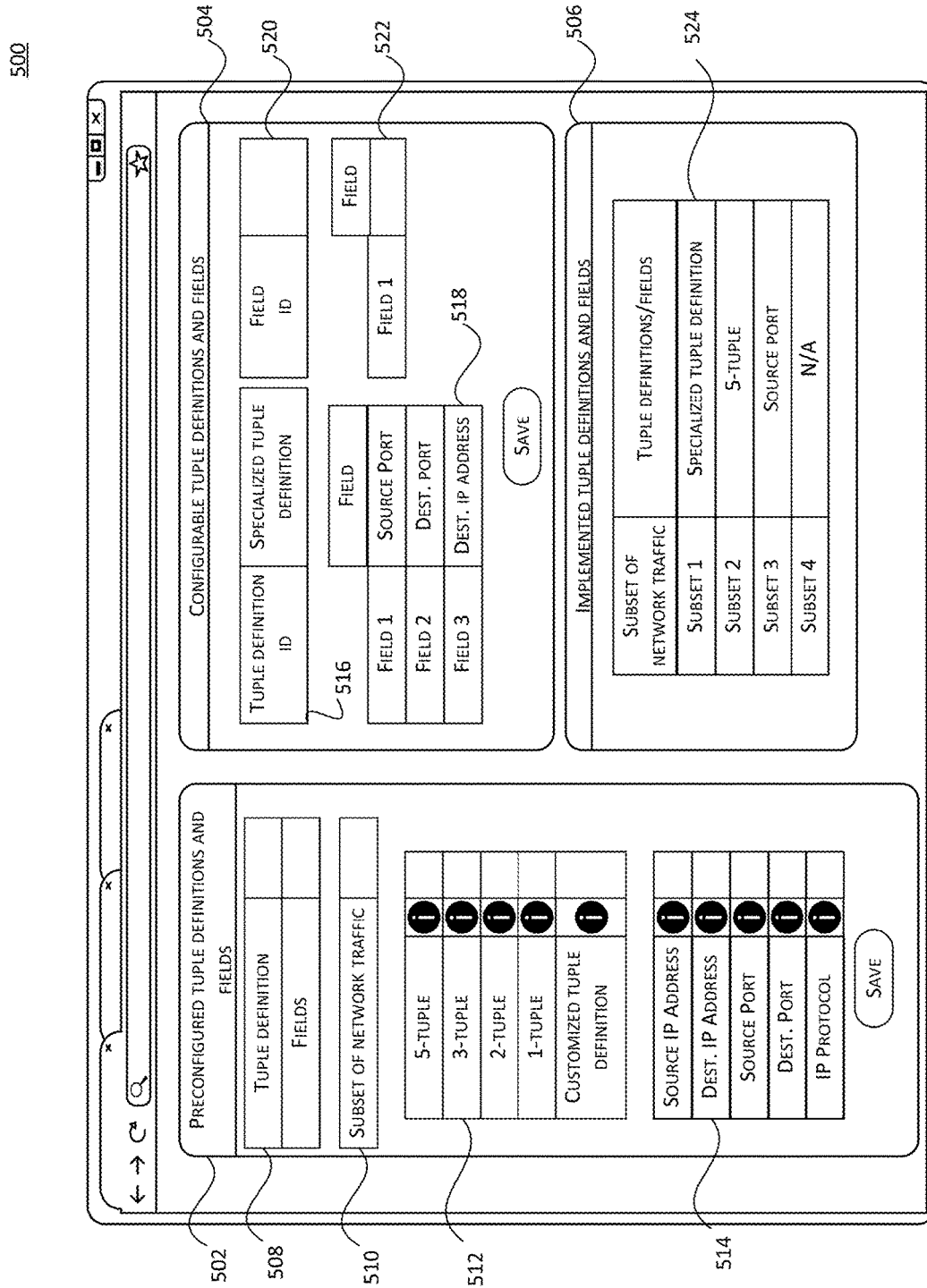
FIG. 5 is an example client interface that allows a client to arbitrarily define a tuple for hashing at a stateful network routing service.

FIG. 5 depicts an example client interface 500 for managing a tuple definition at a stateful network routing service. The example client interface 500 is illustrative of an interface that the stateful network routing service or a system associated with the stateful network routing service generates and presents to a customer who is associated with network traffic that is being intercepted by the stateful network routing service. The example client interface 500 can communicate with a stateful network routing service storing routing rules that indicate a particular custom tuple definition (e.g., a collection of fields) that should be used by the stateful network routing service when routing packets of network traffic. Multiple custom tuple definitions may be stored and each custom tuple definition may correspond to a traffic corresponding to a client, a network environment, a computing device, or any other subset of network traffic. In the example of FIG. 5, the client interface 500 includes a number of tuple definitions, both preconfigured and customizable, that have been added to a subset of network traffic via a computing device of the client. Further, the client interface 500 can include tuple definitions that are available to be added to a subset of network traffic via the computing device of the client. As will be described in more detail below, the system may present the client interface 500 to the client so that the client can interact with the client interface 500 in order to provide a custom tuple definition.

Via the client interface 500, the client may define a customized tuple definition including a customized group of fields or a customized field. The stateful network routing service may use the customized tuple definition to determine how to route network traffic received at the stateful network routing service. For example, the client may provide, via a computing device in communication with the client interface 500, a custom tuple definition that applies to traffic received from network host #1. For network traffic received from network host #1, the stateful network routing service may use the custom tuple definition in order to define flows of network traffic.

The customized tuple definition may identify a set of fields, a range of bits, a location, or a portion of a packet. For example, the tuple definition may correspond to a predetermined 5-tuple tuple definition that includes a source IP address, a destination IP address, a source port, a destination port, and a protocol. Further, the client may customize the tuple definition to include only a source IP address and a source port. The tuple definition may be used by the stateful network routing service to generate a tuple value for a given packet based on corresponding field values obtained from the packet. For example, the client, via the client interface 500, may select one or more fields for the custom tuple definition, the one or more fields identifying pre-defined fields that correspond to known bit ranges within the packet header, client-defined fields within the packet header, etc. Therefore, the client is able to provide a custom tuple definition for a subset of the network traffic.

Based on the different subsets of network traffic and the corresponding custom tuple definitions provided by the client, the client interface 500 may include a designation of the custom tuple definition that is being applied to each subset of network traffic. The client interface 500 may further include other settings in order to modify a given custom tuple definition for a given subset of network traffic. In some embodiments, a subset of network traffic may default to a predetermined tuple definition and the client may modify the predetermined tuple definition.

In one embodiment, the client interface 500 is associated with a particular serviced environment and network traffic associated with the serviced environment. In another embodiment, the client interface 500 may be associated with multiple serviced environments, and may enable the client to toggle between individual environments. For example, the client may correspond to multiple serviced environments and the client may interact with the client interface 500 in order to select a custom tuple definition for a first serviced environment and a custom tuple definition for a second serviced environment.

As shown in FIG. 5, the client interface 500 includes an application interface 502, a customization interface 504, and an implementation interface 506. A particular serviced environment may correspond to a number of tuple definitions and a number of fields that the client can use to identify flows of traffic associated with the serviced environment. As will be further discussed, the tuple definitions and the fields can correspond predetermined tuple definitions or fields or can correspond to customized tuple definitions or fields. The application interface 502 of the client interface 500 may include a selection interface 508. The selection interface 508 allows the client to select whether tuple definitions or collection of fields should be applied to the identified network traffic. Further, upon interaction with the selection interface 508, the client interface 500 may present a number of tuple definitions or a number of fields for selection by the client. In some embodiments, the selection interface 508 may allow the client to select tuple definitions and fields for selection by the client.

In order to apply a given tuple definition or collection of fields to traffic, a client may interact with a network traffic interface 510 to select a subset of network traffic associated with the client. More specifically, the client may interact with the network traffic interface 510 to identify a subset of network traffic for which the custom tuple definition defined by the application interface 502 will be implemented. The network traffic interface 510 allows for the client to designate multiple tuple definitions for a specific serviced environment. For example, the client may select a first custom tuple definition for traffic between the first serviced environment and a second serviced environment and a second custom tuple definition for traffic between the first serviced environment and a third serviced environment. In some embodiments, the client may apply the same custom tuple definition to all network traffic associated with the serviced environment and thus the application interface 502 may not include a network traffic interface 510. Therefore, a client interface 500 may be provided for each serviced environment and the network traffic interface 510 may designate one or more subsets of network traffic associated with the particular serviced environment.

As noted above, a client may define a subset of network traffic and a corresponding tuple definition for the subset of traffic. In order to designate the tuple definition for the subset of traffic, the client may interact with a tuple definition interface 512 that allows the client to select one or more predetermined tuple definitions. The tuple definition interface 512 may identify one or more pre-defined tuple definitions available for selection by the client. Further, the tuple definition interface 512 may identify pre-determined tuple definitions provided by the stateful network routing service and pre-determined tuple definitions provided by the client. For example, the tuple definition interface 512 may identify tuple definitions such as "5-tuple," "4-tuple," "3-tuple," "2-tuple," "1-tuple," and "specialized tuple definition." Each of "5-tuple," "4-tuple," "3-tuple," "2-tuple," and "1-tuple" may be tuple definitions defined by the client interface 500 and "specialized tuple definition" may be a tuple definition defined by the client. The tuple definition interface 512 may include more or less tuple definitions for selection by the client. Based upon a client interaction with the selection interface 508, the client may select particular tuple definitions from the tuple definition interface 512. Therefore, the tuple definition interface 512 allows the client to select tuple definitions for a particular subset of network traffic.

As noted above, the client may identify a tuple definition or a collection of fields for use in defining flows of network traffic. More specifically, the client may define one or more fields that should be used by the stateful network routing service when defining flows of network traffic. The one or more fields can be selected using a field interface 514. The field interface 514 may identify one or more defined fields associated with the serviced environment and/or the client. Further, the field interface 514 may identify fields provided by the stateful network routing service and fields provided by the client. For example, the field interface 514 may identify fields defined by the stateful network routing service such as "source IP address," "destination IP address," "source port," "destination port," and "IP protocol." In some embodiments, the field interface 514 may include fields defined by the client. The field interface 514 and the tuple definition interface 512 may further provide information indicating the parameters, field, etc. associated with a particular field and/or configuration. Therefore, the field interface 514 allows the client to select fields for a particular subset of network traffic.

In order to customize tuple definitions for subsequent association with a given subset of network traffic, as noted above, the client may interact with a customization interface 504 that allows the client to configure and/or modify tuple definitions and fields. The customization interface 504 allows the client to define one or more tuple definitions and/or fields that the client may further associate with a subset of network traffic.

As noted above, the client may interact with the customization interface 504 to customize a tuple definition and each customized tuple definition may be associated with a customized tuple identifier 516. The customized tuple identifier 516 allows the client to provide an identifier, name, or other tag associated with a customized tuple definition. For example, the customized tuple identifier 516 allows the client to select an alphabetical, numeric, alphanumeric, or symbolic string to associate with a customized tuple. In some embodiments, the customization interface 504 may not include a customized tuple identifier 516. Further, the stateful network routing service may randomly, sequentially, or otherwise assign a customized tuple identifier 516 to a customized tuple definition.

The customized tuple identifier 516 may correspond to a customized tuple definition. In order to define the customized tuple definition, the client may interact with a customized tuple definition interface 518. The customized tuple definition interface 518 allows the client to define a customized tuple definition for association with a subset of network traffic. For example, the customized tuple definition interface 518 allows the client to define a customized tuple definition comprising one or more fields. The client can select predetermined fields or customized fields for inclusion in the customized tuple definition. For example, the customized tuple definition interface 518 may provide fields such as "source IP address," "destination IP address," etc. Further, the customized tuple definition interface 518 may allow the client to select fields based upon a particular field, a particular bit range, etc. In the example of FIG. 5, the customized tuple identifier 516 is "specialized tuple definition" and corresponds to the following fields as defined by the customized tuple definition interface 518: "source port," "destination port," and "destination IP address." The customized tuple identifier 516 "specialized tuple identifier" therefore defines a tuple based on "source port," "destination port," and "destination IP address."

The client may also define fields of a given packet that can be used in customized tuple definitions. The client may associate a given field with a field identifier 520. The field identifier 520 allows the client to provide an identifier, name, or other tag associated with a custom field. The field identifier 520 may further be included within the customized tuple definition interface 518 for inclusion within a customized tuple definition. Therefore, the field identifier 520 allows the client to select a field identifier for a customized field.

In order to define a given customized field, the client may interact with a customized field interface 522. The customized field interface 522 allows the client to define a custom field for application to a subset of network traffic or for inclusion in a customized tuple definition. For example, the client may interact with the customized field interface 522 to define a field based on certain parameters such as bit range or a particular field name. Further, the client may input a particular bit range such as row one, bits zero through four such that the field is linked to the particular bit range. Further, the client may input a particular field name such as "protocol" such that for the stateful network routing service searches a packet header for "protocol." By allowing the client to provide a customized field, the client can select new, rare, or otherwise currently unknown fields.

As noted above, a client may define a customized tuple definition or customized field via the customization interface 504 and apply tuple definitions or fields via the application interface 502, the implementation interface 506 may further identify the implemented tuple definitions or fields. The implementation interface 506 indicates the tuple definitions and fields that the client has implemented for particular subsets of network traffic. In some embodiments, the same tuple definition is applied to all network traffic associated with a particular serviced environment. In other embodiments, the implementation interface 506 may not provide a tuple definition or field for a particular subset of network traffic and a default tuple definition or field may be applied by the stateful network routing service. In the example of FIG. 5, tuple definition "specialized tuple definition" is applied to subset of network traffic "subset 1," tuple definition "5-tuple" is applied to subset of network traffic "subset 2," field "source port" is applied to subset of network traffic "subset 3," and no tuple definition is applied to subset of network traffic "subset 4."

Figure 6:
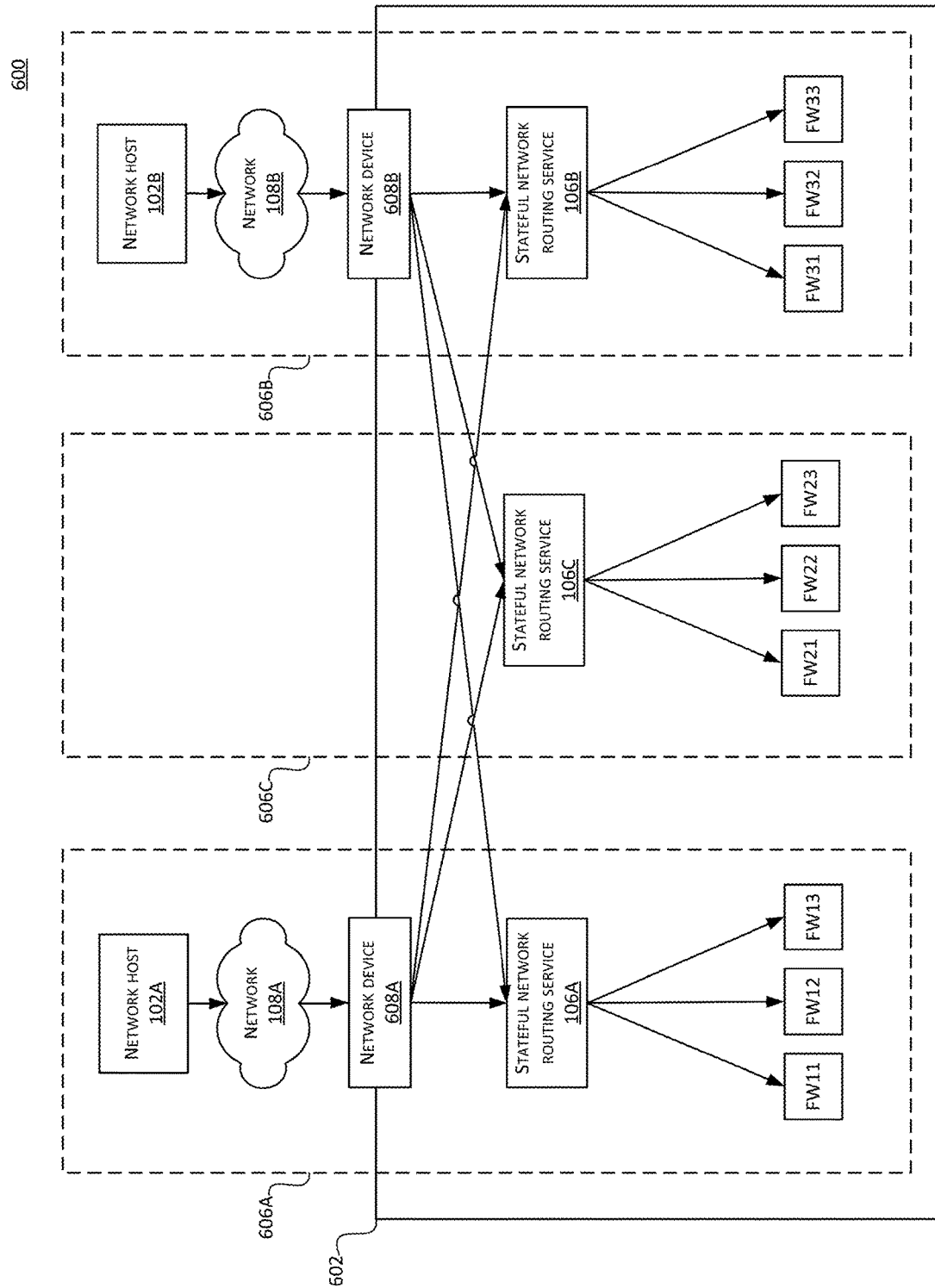
FIG. 6 depicts a schematic diagram for a network device routing traffic to a stateful network routing service and network appliances according to some embodiments.

In order to implement a given tuple definition, a packet may be parsed for field values corresponding to the tuple definition. The field values may then be sorted into a tuple value that is linked to a specific network appliance. The field values may be sorted such that the tuple value is a direction agnostic tuple value that corresponds to multiple unidirectional flows of network traffic. FIG. 6 illustrates an example environment 600 according to various embodiments including multiple instances 106A, 106B, and 106C of the stateful network routing service, which illustratively correspond to instances of the stateful network routing service 106 that exist within multiple availability zones, such as distributed across a number of regions. As shown in FIG. 6, the instances 106A, 106B, and 106C of the stateful network routing service are configured to obtain packets generated by network hosts 102A, 102B and pass those packets to a fleet of appliances (designated as firewall 11-firewall 33 (FW11-FW33) in FIG. 6) for processing. The example environment 600 enables a regional view of the instances 106A, 106B, and 106C of the stateful network routing service and network hosts 102A, 102B distributed across and contained within multiple availability zones 606A, 606B, 606C. As discussed herein, the use of a direction agnostic tuple value, along with propagation of rules memorializing routing decisions made at one instance of the service 106 to other instances of the service 106, ensures that network traffic and return network traffic are sent to the same instance 106A, 106B, 106C of the stateful network routing service and the same network appliance.

The networked environment 600 includes a network host 102A and a network host 102B (which illustratively exist within separate availability zones) and a virtual private environment 602 including a fleet of appliances, which are in data communication with each other via a network 108A, 108B and network devices 608A, 608B. Each availability zone 606A, 606B, 606C may include a network host 102A, 102B, a network 108A, 108B, a network device 608A, 608B, instances 106A, 106B, and 106C of the stateful network routing service, or a collection of network appliances. In some embodiments, the network hosts 102A, 102B and the network devices 608A, 608B may exist within the same availability zone. The virtual private environment 602 may be logically distributed among a plurality of availability zones 606A, 606B, and 606C, each of which represents a logically isolated network environment. A logically isolated network environment may include a group of computing devices, network devices, and/or network appliances that are logically isolated from other groups of devices (e.g., the logically isolated network environment does not share a connection with another network environment). Each of the plurality of availability zones 606A, 606B, and 606C may further correspond to an instance of stateful network routing service 106 (shown in FIG. 6 as stateful network routing services 106A-C) and an associated plurality of network appliances (e.g., FW11, FW12, and FW13), which in the illustration of FIG. 6 provide a firewall service to the hosts 102A, 102B.

As noted above, a serviced environment may require certain operations to be performed on network traffic. A network host 102A may transmit traffic to a network host 102B and prior to the network host 102B receiving the traffic, the operations may be performed on the traffic. In order to implement these operations, a network device 608A may receive network traffic generated by the network host 102A via the network 108A and transmit it to the virtual private environment 602 for these operations. Illustratively in FIG. 6, the network device 608A may act as a network gateway for transmitting the network traffic from the network host 102A to the virtual private environment 602. In some embodiments, the network device 608A may be located in the virtualized private environment 602 but separate from the instances 106A, 106B, and 106C of the stateful network routing service. In other embodiments, the network device 608A may be located in the network 108A or otherwise separate from the virtual private environment 602. The virtual private environment 602 may include instances 106A, 106B, and 106C of the stateful network routing service and a plurality of subsets of network appliances for each instance of the stateful network routing service. The network device 608 may select an instance 106A, 106B, and 106C of the stateful network routing service and a network appliance for the packet. Each instance 106A, 106B, and 106C of the stateful network routing service may further act as a network gateway for transmitting traffic to the network appliances. For example, an instance 106A, 106B, and 106C of the stateful network routing service may act as a gateway to transmit traffic from the network host 102A to the network appliances.

While described above as a component of the serviced environment of the host 102A, 102B, the network device 608A, 608B may be a component of other networks, such as an 'edge router' controlling traffic into the serviced environment (which edge router may exist outside of the environment) or a gateway of other serviced environments.

The virtual private environment 602 may correspond to a configurable pool of network resources that may be used as a client platform to perform one or more operations on the plurality of packets. The virtual private environment 602 may be a grouping of scalable resources for performing the operations. Further, the virtual private environment 602 may provide a number of network resources across a plurality of availability zones, each of which represents an isolated set of physical devices hosting such a zone. For example, the virtual private environment 602 may include a number of network resources in a first availability zone and a number of network resources in a second availability zone. The virtual private environment 602 may further isolate network traffic within the environment 602 from traffic external to the environment 602. For example, the virtual private environment 602 may correspond to a specific client and/or user and include a distinct set of IP addresses. The distinct set of IP addresses may be associated with a plurality of network appliances, network gateways, etc., operating within the environment 602.

The virtual private environment 602 is further shown as divided into a number of subnets and/or zones 606 (across the virtual private environment 602, zones 606A, 606B, and 606C), which may also be referred to as availability zones or availability regions. Each availability zone may also correspond to a network host 102A, 102B and a network device 608A, 608B. Each zone 606A, 606B, 606C illustratively represents a computing system that is isolated from the systems of other zones 606A, 606B, 606C in a manner that reduces a likelihood that wide-scale events such as a natural or man-made disaster, impact operation of all (or any two) zones 606A, 606B, 606C in a virtual private environment 602. For example, the computing resources of each zone 606A, 606B, 606C may be physically isolated by being spread throughout the virtual private network environment 602 at distances selected to reduce a likelihood of a wide-scale event affecting performance of all (or any two) zones 606A, 606B, 606C. Further, the computing resources of each zone 606A, 606B, 606C may be associated with independent electric power, and thus be electrically isolated from resources of other zones 606A, 606B, 606C (though the resources may still communicate with one another via a network, which may involve transmission of electrical signals for communication rather than power), independent cooling systems, independent intra-zone networking resources, etc. In some instances, zones 606A, 606B, 606C may be further isolated by limiting operation of computing resources between zones 606A, 606B, 606C. For example, virtual machine instances in a zone 606A, 606B, 606C may be limited to using storage resources, processing resources, and communication links in that zone 606A, 606B, 606C. Restricting inter-zone cloud or network-based computing operations may limit the "blast radius" of any failure within a single zone 606, decreasing the chances that such a failure inhibits operation of other zones 606. Illustratively, services provided by the network appliances may generally be replicated within zones, such that a client can (if they so choose) utilize the network appliances entirely (or almost entirely) by interaction with a single zone 706.

Each subnet and/or availability zone 606A, 606B, 606C may further include an instance of the stateful network routing service (e.g., instance 106A) and a plurality of scalable network appliances (e.g., FW11, FW12, and FW13) in order to perform monitoring and/or management functions on the packets. Each availability zone 606A, 606B, 606C may correspond to a unique instance of the stateful network routing service and a unique set of network appliances. For example, availability zone 606A corresponds to network host 102A, network device 608A, instance 106A of the stateful network routing service, and network appliances FW11, FW 12, and FW13, availability zone 606B corresponds to network host 102B, network device 608B, instance 106B of the stateful network routing service, and network appliances FW21, FW22, and FW23, and availability zone 606C corresponds to instance 106C of the stateful network routing service and network appliances FW31, FW32, and FW33. In some embodiments, the virtual private environment 602 includes more or less availability zones. Each instance of the stateful network routing service may select a network appliance to route a given flow of network traffic. For example, where a flow is defined by the source IP address and the destination IP address, traffic from the network host 102A to the network host 102B and from the network host 102B to the network host 102A may be routed by the network device to the same instance of the stateful network routing service. Further, the stateful network routing service, based on the traffic corresponding to a particular flow, may route the flow of network traffic to the same network appliance. Each network appliance may perform the same one or more operations on a packet received from the network host 102A, 102B. The plurality of scalable network appliances may correspond to a resilient managed service for a client associated with a network host 102A, 102B. In some embodiments, the network appliances may correspond to third party network appliances. The network appliances may be scaled according to desired performance (e.g., throughput, number of flows, flows per second, etc.) and can be scaled elastically. For example, the quantity of network appliances can be changed as network traffic volume changes and as the network traffic volume increases or decreases, network appliances may be added to the quantity of network appliances or removed from the quantity of network appliances. Network traffic may further be automatically rerouted to a healthy network appliance in the event that a network appliance is unhealthy and/or otherwise unavailable. Further, network traffic to a now unavailable network appliance may gracefully failover into a currently available network appliance.

In order to communicate data to a network host 102B, the network host 102A may generate a plurality of packets. The plurality of packets may be delivered intermittently over a period of time to the network 108A for transmission to the destination network host 102B. Prior to the destination network host 102B receiving the plurality of packets, the packets may be intercepted by a network device 608A. The network device 608A may route the plurality of packets to a specific instance 106A, 106B, 106C of the stateful network routing service within a virtual private environment 602.

To ensure that the bidirectional network traffic is sent to the same instance of the stateful network routing service and to ensure that the bidirectional network traffic is sent to an instance of the stateful network routing service in a same availability zone as the network host that transmitted the packet, the network device 608A can receive traffic from the network host 102A and distribute the traffic to a specific instance 106A, 106B, 106C of the stateful network routing service associated with the zone of the network host 102A and the network device 608A. In the example of FIG. 6 the network host 102A is instantiated in availability zone 606A and the network device 608A may send traffic from network host 102A to an instance 106A of the stateful network routing service in availability zone 606A for passage to a specific appliance in availability zone 606A. Further, the network device 608A may route traffic associated with the particular flow of network traffic to the same instance 106A of the stateful network routing service and the same network appliance in the same availability zone such that each packet associated with the flow of network traffic is passed to the same network appliance.

As a particular flow of traffic is bidirectional (e.g., corresponds to traffic from network host 102A to network host 102B and traffic from network host 102B to network host 102A), it may be desirable to route network traffic from network host 102A to network host 102B and network traffic from network host 102B to network host 102A to ensure that the same network appliance handles both parts of the two-part flow. The network devices 608A, 608B may be stateless network devices and may select a network appliance for the traffic based on a tuple value for the packet. In some embodiments, in order to transmit the traffic to the network appliance, the network device 608A, 608B may select an instance 106A, 106B, 106C of the stateless network routing service for the traffic and, upon transmitting the network traffic to the instance 106A, 106B, 106C, the instance 106A, 106B, 106C may transmit the packet to a particular networked appliance. The tuple value may be direction agnostic in that the network devices 608A, 608A may parse the packet to determine the tuple value without regard to the direction that the packet is being sent. For example, the network devices 608A, 608B may parse the field values of the packet header to determine data groups such as IP addresses, ports, protocol. However, the network devices 608A, 608B may not differentiate between directional field values of the packet header. For example, the network devices 608A, 608B may not differentiate between a source IP address and a destination IP address. Instead, source IP address and destination IP address may be stored by the network devices 608A, 608B as a group of IP addresses. Further, each data group may be ordered based on certain characteristics such as lowest to highest, highest to lowest, etc. The data groups may subsequently be stored as a direction agnostic tuple value stored in a cache or flow data store associated with the network device in order to route subsequent packets associated with the bidirectional flow. By not linking the value to a specific field such as "destination IP address," the network device 608 is able to generate a tuple value that applies to a bidirectional flow of network traffic, rather than having tuple values differ between directions of a communication session.

As noted above, the network devices 608A, 608B may determine a direction agnostic tuple value for a given bidirectional flow. In order to ensure that the direction agnostic tuple value is applied to each half of a bidirectional flow, the direction agnostic tuple may be provided to additional network devices. In the example of FIG. 6, the network device 608A may determine a direction agnostic tuple value based on receiving a packet of traffic, store the direction agnostic tuple value in a local data store, and provide the direction agnostic tuple value to network device 608B. The direction agnostic tuple value may be provided to each network device associated with a given packet of network traffic. The direction agnostic tuple value may be provided to additional network devices, prior to network device 608A routing the packet of network traffic to a given instance 106A of the stateful network routing service and a given network appliance. The network device 608 may be a routing device with multiple interfaces (logical, virtual, or physical interfaces) where each interface corresponds to a given instance of the stateful network routing service. For example, the multiple interfaces may correspond to multiple Ethernet cables associated with the network device 608. Data may be passed from the network device 608 to a given instance of the stateful network routing service via a corresponding interface. For example, the network device 608 may pass data to instance 106A of the stateful network routing service via a first interface, instance 106B of the stateful network routing service via a second interface, and instance 106C of the stateful network routing service via a third interface. In some embodiments, the network device 608 can be included within the virtual private environment 602.

As noted above, the network devices 608A, 608B may determine a direction agnostic tuple value for a given packet. To facilitate routing of packets to a particular instance 106A, 106B, 106C of the stateful network routing service and a particular network appliance, the network device 608A, 608B may maintain local memory. The local memory may indicate a next hop (e.g., a next network device) to which to route packets corresponding to specific flow information. In accordance with embodiments of the present disclosure, the "next hop" associated with traffic flowing from a network host 102A, 102B may be a logical representation of an instance 106A, 106B, 106C of the stateful network routing service. In order to ensure that a direction agnostic tuple value has not been previously created for a given packet, the network devices 608A, 608B may parse a flow data store or cache local to the network devices 608A, 608B to determine if the direction agnostic tuple value has been stored. On receiving a packet, the network device 608 may consult local memory to determine if a routing decision is stored in local memory for the given flow. If the routing decision is not stored in local memory for the flow, the network device 608 may consult the routing table to determine how to route the packet. In the event that the direction agnostic tuple value is stored by the network devices 608A, 608B, the network devices 608A, 608B may not generate a direction agnostic tuple value for the given flow and may obtain the direction agnostic tuple value from a data store.

In response to receiving the packets sent from network host 102A to network host 102B or separately from the packets sent from network host 102A to network host 102B, the network host 102B may generate a plurality of packets in order to communicate data to network host 102A. The plurality of packets may be delivered intermittently over a period of time to the network 108B for transmission to the network host 102A. Prior to the network host 102A receiving the plurality of packets, the packets may be intercepted by the network device 608B. The network device 608B intercepting traffic may parse the packet of network traffic from the network host 102B for a direction agnostic tuple value. Based on the network device 608A storing the direction agnostic tuple value in a data store local to the network device 608B (e.g., in the same availability zone 606B), the network device 608B may determine the instance of the stateful network routing service and the network appliance for the packet. The packet may be routed by the network device 608B to the same instance of the stateful network routing service and the same network appliance as the packet from the network device 608B. In some embodiments, the packet from network device 608B may not correspond to the particular direction agnostic tuple value and the network device 608B may determine a new direction agnostic tuple value. As the packet from network device 608A and network host 102A and the packet from network device 608B and 102B may be routed to the same network appliance and the same instance of the stateful network routing service, the flow of network traffic may be directional and each half of the flow of traffic may be routed to the same network appliance.

Figure 7:
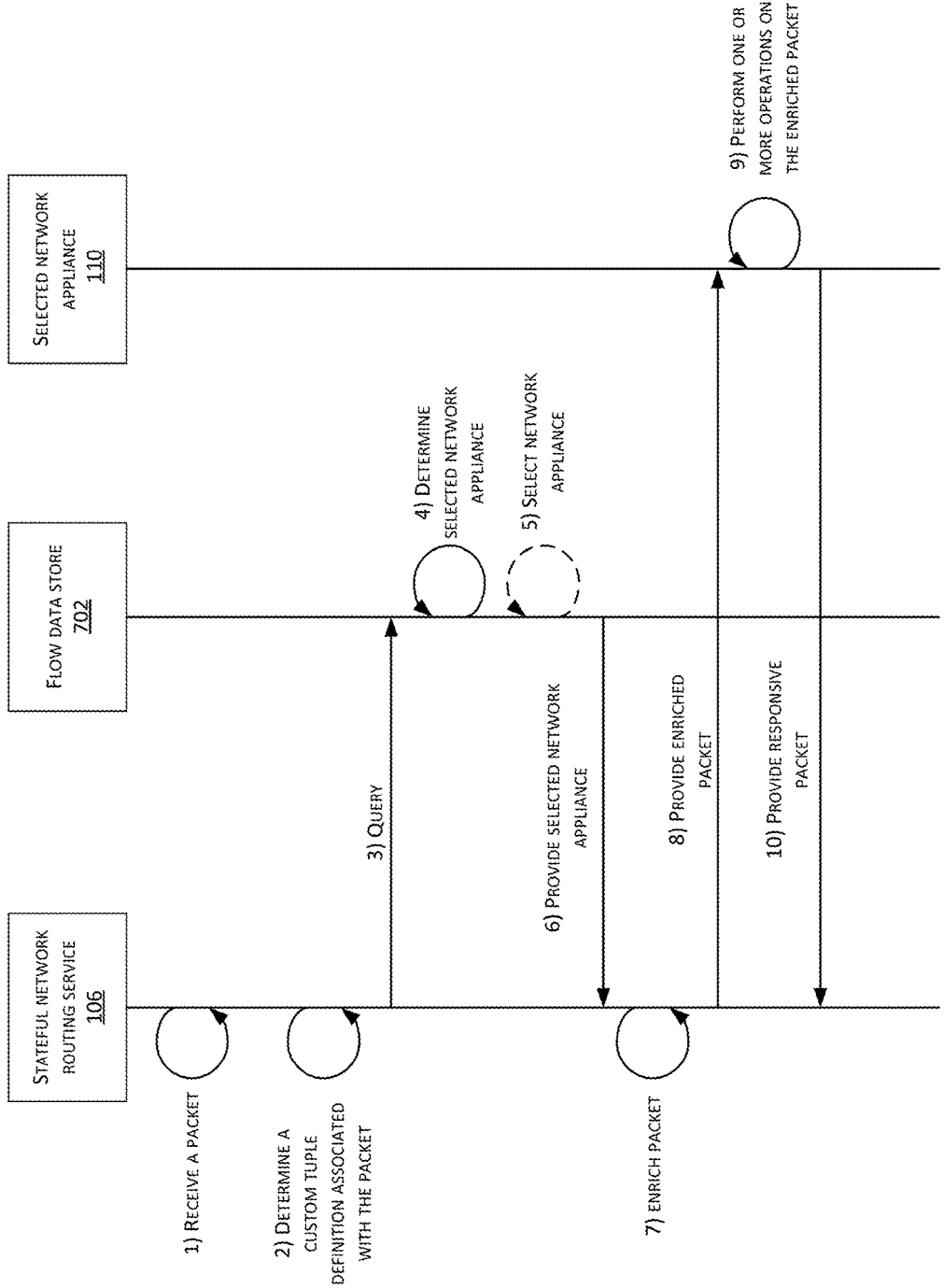
FIG. 7 depicts an example workflow for a stateful network routing service receiving a tuple definition to use in selecting a network appliance.

As noted above, a client may define customized tuple definitions that are associated with a given subset of network traffic. The customized tuple definitions may indicate a manner of identifying flows of network traffic. With reference to FIG. 7, illustrative interactions 700 for selecting a network appliance for a flow of network traffic based on the customized tuple definition will now be described. Specifically, the illustrative interactions of FIG. 7 depict how the stateful network routing service 106 can apply a customized tuple definition (e.g., a designation of one or more fields of the packet) to determine a network appliance that the packet should be routed.

At (1), as described above, the stateful network routing service 106 receives a packet corresponding to a flow of network traffic between a source network host and a destination network host in order to provide the packet to a network appliance for one or more operations. The stateful network routing service 106 may intercept the packet during a transmission of the packet between the source network host and the destination network host.

At (2), the stateful network routing service 106 determines a custom tuple definition associated with the specific flow of network traffic. The stateful network routing service 106 may store a custom tuple definition that applies to each packet received by the stateful network service 106. The stateful network routing service 106 may further store the custom tuple definitions in a cache, memory, or other storage local or remote from the stateful network routing service. In some embodiments, the stateful network routing service 106 may store a plurality of custom tuple definitions that are each applicable to a subset of network traffic. Further, the stateful network routing service 106 may apply a customized tuple definition to a specific serviced environments and therefore, to determine a custom tuple definition, may determine a serviced environment associated with the packet. For example, the stateful network routing service 106 may indicate that traffic from network host 102A corresponds to custom tuple definition #1 and traffic from network host 102B corresponds to custom tuple definition #2. Each custom tuple definition may identify fields of a packet for use in defining a tuple value. Based on the custom tuple definition applicable to a given packet, the stateful network routing service 106 may determine a tuple value as a combination of field values from the packet based on the custom tuple definition. For example, the tuple value may include field values that correspond to the fields: source IP address, destination IP address, source port, destination port, and protocol. Upon receiving a packet of network traffic, the stateful network routing service 106 may parse the packet to determine a tuple value based on the custom tuple definition. Therefore, the stateful network routing service 106 is able to determine a custom tuple definition for use in selecting a network appliance for the packet.

At (3), based at least in part on the stateful network routing service 106 determining a custom tuple definition associated with the packet, the stateful network routing service 106 queries a flow data store 702 for the tuple value associated with the packet. The flow data store 702 may store routing rules which link a particular value to a particular network appliance. The flow data store 702 may further store a routing rule corresponding to custom tuple definitions. For example, the stateful network routing service 106 may query the flow data store 702 for a particular appliance to which to route a packet with a tuple value of ("destination IP address #3," "protocol #5," "source port #2," and "destination port #7").

At (4), the flow data store 702 determines if a routing rule associated with the particular tuple value is stored by the flow data store 702. In the event that the routing rule is stored by the flow data store 702, the flow data store 702 may determine a selected network appliance for the flow of network traffic based on the routing rule. Therefore, the stateful network routing service identifies a routing rule associated with the particular tuple if stored by the flow data store 702.

In the event that a routing rule associated with the particular tuple value is not stored by the flow data store 702, at (5), the flow data store 702 selects a network appliance for the tuple value. The flow data store 702 may select a network appliance for the packet of network traffic based, for example, on load balancing considerations among a fleet of appliances. Further, the flow data store 702 may store a new routing rule indicating the selected network appliance for the particular tuple value. The flow data store 702 may subsequently use the routing rule to route packets containing the tuple value. Therefore, the flow data store 702 can select a network appliance for packets corresponding to the tuple value.

At (6), the flow data store 702 provides an indication of the selected network appliance to the stateful network routing service 106. The stateful network routing service 106 may cache the indication provided by the flow data store 702 for use in subsequent packets received by the stateful network routing service 106.

At (7), the stateful network routing service 106 enriches the packet. The stateful network routing service 106 may enrich the packet such that a new destination IP address corresponds to the selected network appliance. In some embodiments, the stateful network routing service 106 may further enrich the packet by adding the flow identification information to a header of the packet in order to track a packet that may be sent to a full proxy mode appliance. The stateful network routing service 106 may enrich the packet during an encapsulation process. For example, the stateful network routing service 106 may receive the packet and encapsulate the packet with additional information such as a TCP information layer, an IP information layer, etc.

At (8), the stateful network routing service 106 provides the enriched packet to the selected network appliance 110 in order for the selected network appliance to perform operations on the enriched packet.

At (9), the selected network appliance 110 performs one or more operations on the enriched packet based on requirements of the serviced environment. For example, the network appliances 110 may perform one or more firewalling operations on the enriched packet based on a firewalling requirement by the serviced environment.

At (10), after performing the one or more operations on the enriched packet, the selected network appliance 110 provides a responsive packet to the stateful network routing service 106 for further transmission to the destination network host. Therefore, a responsive packet may illustratively represent a modified version of the enriched packet to the stateful network routing service 106, created by the selected network appliance 110 based at least in part on the one or more functions of the selected network appliance 110 (e.g., application of firewall rules to the enriched packet).

Figure 8:
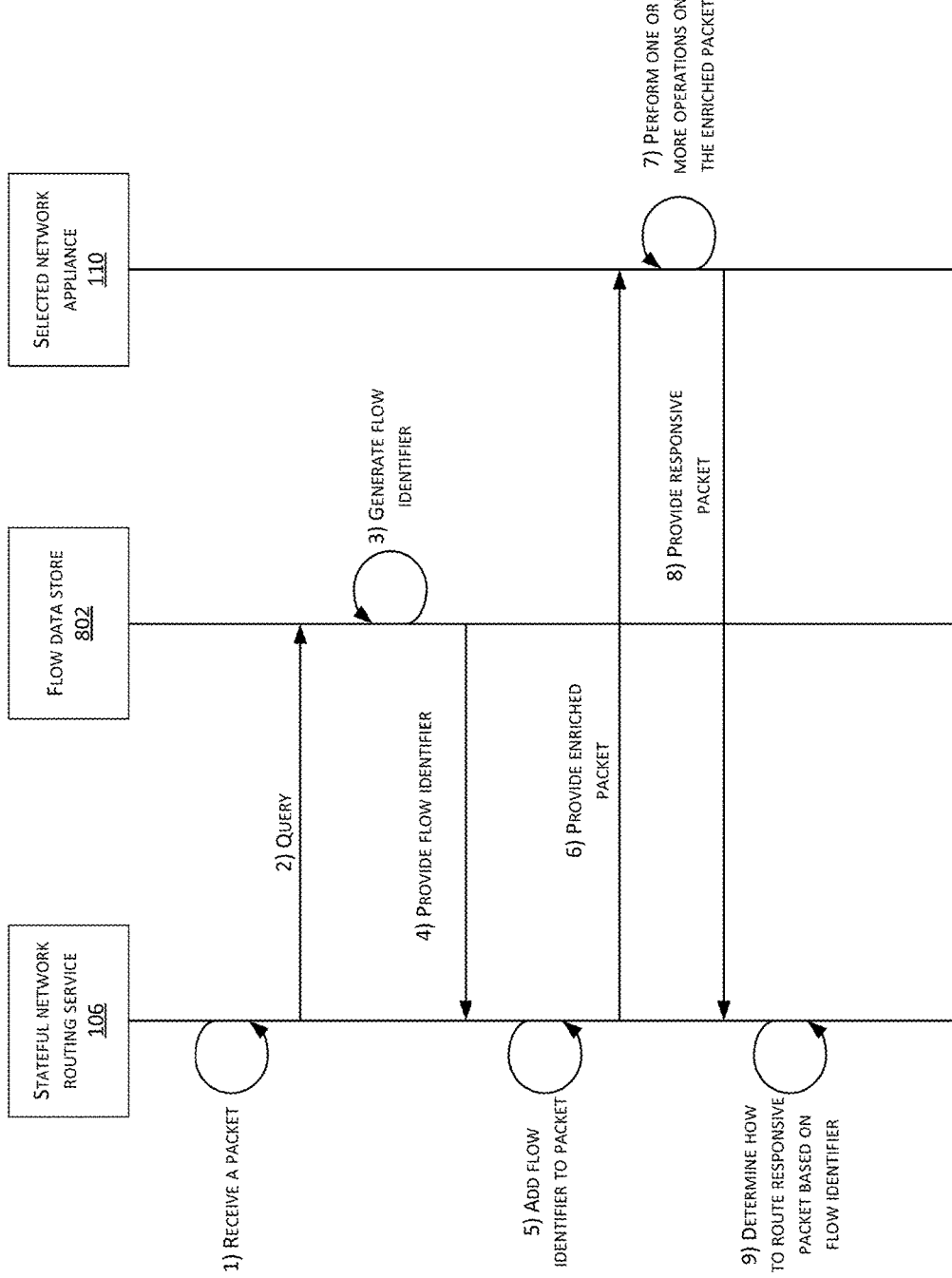
FIG. 8 depicts an example workflow for a stateful network routing service requesting a flow validator in response to receiving a packet.

As noted above, the stateful network routing service 106 can determine a network appliance to route a particular packet of network traffic. In some embodiments, an appliance may operate in full proxy mode and thus it may be difficult for the stateful network routing service 106 to associate a packet transmitted to the network appliance with a packet received from the network appliance where the packets represent a logical flow between two network hosts. In accordance with aspects of the present disclosure, in order to identify two seemingly different flows that represent the same logical flow (e.g., a single communication session between two proxied parties), the stateful network routing service 106 may include, in an encapsulated packet header a flow identifier to facilitate correlation of the two flows by the stateful network routing service 106. The interactions of FIG. 8 begin at (1), the stateful network routing service 106 may receive a packet of data. (1)-(4) are similar to (1)-(6) of FIG. 7 as discussed above. In addition to receiving the packet, the stateful network routing service 106 may determine that the packet is to be transmitted to a full-proxy mode network appliance. This determination may be based on a particular serviced host, a network environment that transmitted the packet to the stateful network routing service 106, or other information associated with the packet.

Each packet received from a particular network host or particular serviced environment may be transmitted to a full-proxy mode appliance. In other embodiments, a packet may contain certain information indicating that the packet should be transmitted to a flow proxy mode appliance. The stateful network routing service 106, in addition to querying the flow data store 702 for a network appliance for the packet, queries the flow data store 702 for a unique flow identifier based on the network appliance operating in full proxy mode. Therefore, based on the packet being designated for transmission to a full-proxy mode appliance, the stateful network routing service queries the flow data store 802 for flow identification information. The flow data store 802 may store a plurality of flow information and a plurality of flow identification information. In some embodiments, the flow data store 802 may store flow identification information for identifying a packet and flow validation information for validating a packet. The flow data store 802 may search for the tuple value of the packet in order to determine flow identification information and/or flow validation information.

The flow data store 802 may generate flow identification information based on determining that the packet is to be transmitted to a full-proxy mode appliance. In some embodiments, a particular flow identifier is generated by the flow data store 802 and used for subsequent packets. In other embodiments, the flow identification information is associated with a particular flow and multiple flow identifiers are generated by the flow data store 802. Therefore, the flow data store 802 may generate a flow identifier to identify the particular flow of network traffic. Further, the flow data store 802 may determine flow validation information as described in the '804 Application, incorporated by reference above.

Based on identifying determining the flow identifier, the flow data store 802 provides the flow identifier to the stateful network routing service 106 based at least in part on the query by the stateful network routing service 106. In some embodiments, the flow data store 802 may provide an indication to the stateful network routing service 106 that one or more of the flow identifier is not stored at the flow data store 802. The stateful network routing service 106 may generate the flow identifier based on the indication of the flow data store 802. Therefore, the stateful network routing service 106 may receive an indication of the flow identifier.

After receiving the flow identifier and a selection of the network appliance, in order to correlate subsequent flows of network traffic, at (5), the stateful network routing service 106 adds the flow identifier to a header of the packet. Further, the stateful network routing service may add a flow validator to the header in order to track whether the packet is sent to an incorrect destination. The stateful network routing service 106 may add the flow identifier to the packet header during an encapsulation process. For example, the stateful network routing service 106 may receive the packet and encapsulate the packet with additional information such as a TCP information layer, an IP information layer, flow identifier, flow validator, etc. Further, the stateful network routing service 106 may cache the flow identifier and the flow validator. The stateful network routing service 106 may store the flow identifier in association with flow information of the packet. The stateful network routing service 106 may store the flow validator and the flow identifier in a cache such that the cache is searchable for the flow validator and the flow identifier. At (6), the stateful network routing service 106 provides the enriched packet with the flow identifier to the network appliances 110 in order for the network appliances to perform operations on the enriched packet.

At (7), the network appliances 110 are full-proxy mode appliances that perform one or more full-proxy mode operations (e.g., network address translation, transport layer security termination, protocol translation) on the packet. The full-proxy mode operations may be based on the serviced environment. For example, the network appliances 110 may perform network address translation based on requirements of the serviced environment. As a result of the full-proxy mode operations, the network appliances 110 may modify one or more of the source IP address, destination IP address, source port, destination port, protocol, etc. of the inner packet header of the enriched packet, as noted above.

At (8), after performing the one or more operations on the enriched packet, the network appliances 110 provide a responsive packet to the stateful network routing service 106 for further transmission to the destination network host. The network appliance 110 may generate the responsive packet by modifying the enriched packet transmitted to the enriched packet. Therefore, the responsive packet may represent a modified version of the enriched packet. The responsive packet may include a modified version of the inner packet header of the enriched packet.

At (9), based on receiving the responsive packet, the stateful network routing service 106 may verify that the responsive packet is the second half of a two-part logical flow. As the network appliance may be a multi-tenanted appliance, the stateful network routing service 106 may identify that the packet corresponds to a particular packet sent out from the stateful network routing service 106. The stateful network routing service 106 may verify the responsive packet by identifying that the responsive packet includes the flow identifier within the packet (e.g., the outer packet header as noted above). In some embodiments, the stateful network routing service 106 may query a cache associated with the stateful network routing service 106 in order to determine if the flow identifier is stored in the cache. Based upon determining the flow identifier is included in the cache, the stateful network routing service 106 routes the responsive packet to the destination. In the event that the flow identifier is not included in the cache, the stateful network routing service may determine that data loss has occurred and may not route the responsive packet to the destination. Based at least in part on a result of the stateful network routing service 106 identifying the received packet, the stateful network routing service 106 may determine how to handle the received packet. For example, where the received packet is successfully identified, the stateful network routing service 106 forwards the received packet to its destination. Where identification fails, the stateful network routing service 106 may drop the packet and/or a notice may be sent to the source network host, destination network host, etc.

As noted above, the stateful network routing service 106 can determine a network appliance to route a particular packet of network traffic. In general, it may be desirable that the same network appliance operates to process both halves of a communication session. In accordance with aspects of the present disclosure, in order to transmit both directional flows of a communication session to the same network appliance, a network device may generate a direction agnostic tuple value and transmit the direction agnostic tuple value. Moreover, in some instances two parties to a communication session may span isolated environments—such as distinct availability zones. To ensure that decisions made by a first instance of the stateful network routing service 106 (e.g., in a first zone) are implemented by a second instance of the stateful network routing service 106 (e.g., in a second zone), each instance of the service 106 can be configured to propagate such decisions to other instances.

Figure 9:
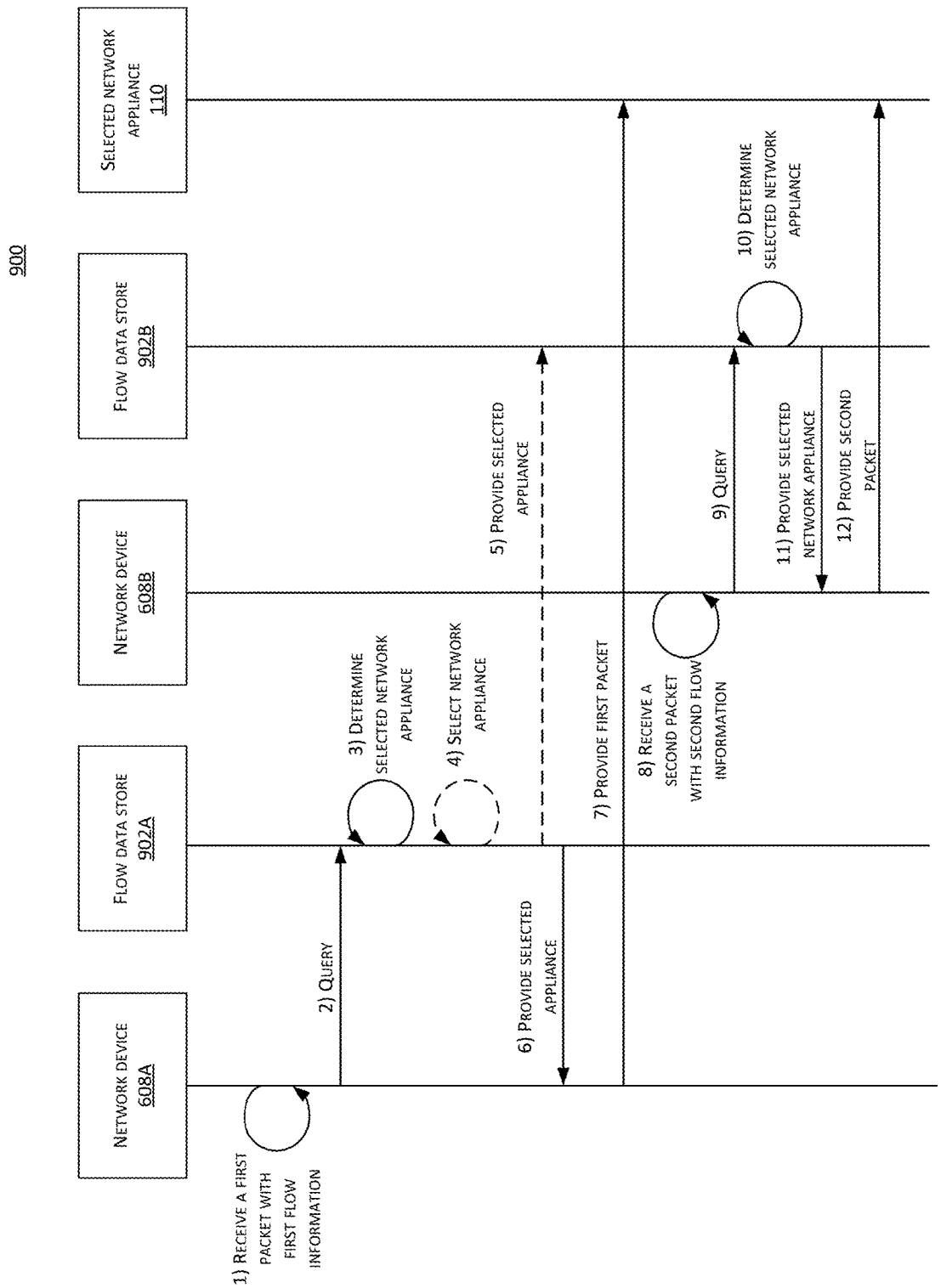
FIG. 9 depicts an example workflow for a network device to receive and pass packets to a stateful network routing service according to some embodiments.

Illustrative interactions for routing packets using direction agnostic tuple values are shown in FIG. 9. The interactions of FIG. 9 begin at (1), where the network device 608A receives a packet of data with first flow information. Interactions (1)-(2) are similar to (1)-(3) of FIG. 7 as discussed above. The network device 608A, in determining the tuple value, determines a direction agnostic tuple value for the first packet. The direction agnostic tuple value may be direction agnostic in that it may ignore a directional component of the field values of the packet header. For example, the network device 608A may determine a group of IP addresses that include both a source IP address and a destination IP address. Further, the network device 608A may store the IP addresses in an agnostic manner such that the IP addresses are not differentiated based on whether they are associated with a source or destination. The network device 608A may parse multiple groups of data from the packet header including IP addresses, ports, or protocols to determine a direction agnostic tuple value. The direction agnostic tuple value may then be used in the query to the flow data store 902A to determine a selected network appliance.

As noted above, the network device 608A may determine a direction agnostic tuple value for the first packet and query the flow data store 902A based on the direction agnostic tuple value to determine a network appliance for the first packet. At (3), the flow data store 902A may determine a selected network appliance that corresponds to the direction agnostic tuple value. For example, the flow data store 902A may search for the direction agnostic tuple value and determine a selected network appliance associated with that value. In some embodiments, determining a selected network appliance may include determining a selected instance of the stateful network routing service, which instance may then select the network appliance. The direction agnostic tuple value and the selected network appliance may be stored as a routing rule, as noted above, by the network device 608A. Interaction (4) is similar to (5) of FIG. 7 as discussed above. In the event that a selected network appliance is not designated for the direction agnostic tuple value, the flow data store 902A may select a network appliance for the direction agnostic tuple value based on a flow hashing (e.g., a cuckoo hash, a sorted hash, etc.). The flow data store 902A may then use the direction agnostic tuple value to determine a selected network appliance for the first packet.

In order to ensure that the direction agnostic tuple value is applied to both sides of a bidirectional tuple value to select the same network appliance, at (5), the routing rule (e.g., the selection of the network appliance for the direction agnostic tuple) value may further be transmitted to a flow data store 902B associated with a network device 608B in a different availability zone. The network device 608A may provide the selection of the network appliance as an indication of the network appliance for the direction agnostic tuple value. In some embodiments, propagation of the routing rule between availability zones may be synchronous with respect to the packet for which a decision is made. For example, an initial packet from network host A to network host B may be delayed while the appliance and direction agnostic tuple value are provided to network devices across availability zones. The network device 608A may synchronously transmit the routing rule to a plurality of network devices through a replication technique (e.g., chain replication, in which each device replicates the rule to a next device) to replicate the routing rule across the plurality of network devices. The routing rule may be provided such that the network device 608A and the network device 608B may determine the same selected network appliance for a given bidirectional flow of network traffic. Interactions (6) and (7) are similar to (6) and (8) of FIG. 7 as discussed above. The flow data store 902A may provide an indication of the selected appliance to the network device 608A and, based on this indication, the network device 608A may provide the first packet to the selected appliance. In order to provide the first packet to the selected network appliance, the network device 608A may provide the first packet to an instance of the stateful network routing service corresponding to the network appliance and the instance of the stateful network routing service may select the network appliance and route the first packet to the selected network appliance.

As noted above, the direction agnostic tuple value and an associated network appliance may be propagated to data stores 902A, 902B associated with network devices 608A, 608B such that the bidirectional flow of network traffic is routed to the same network appliance. At (8), the network device 608B obtains a second packet with second flow information. The second packet is a response to the first packet obtained by network device 608A. As a response to the first packet, the second flow information of the second packet may be an inverse of the first flow information of the first packet. The network device 608B may determine a direction agnostic tuple value as a combination of field values from the packet header. For example, the tuple value may include field values that correspond to the direction agnostic fields: IP address, port, and protocol. Upon receiving a packet of network traffic, the network device 608B may parse the packet to determine the direction agnostic tuple value based on the tuple definition. As the second packet is a response to the first packet, the direction agnostic tuple value of the first packet is the direction agnostic tuple value of the second packet. At (9), the network device 608B may query the flow data store 902B based on the direction agnostic tuple value to determine the selected network appliance for the packet. As the first packet and the second packet have the same direction agnostic tuple value, at (10), the flow data store 902B determines the selected network appliance for the second packet. In some embodiments, the direction agnostic tuple value may not correspond to a previously stored tuple value and the flow data store 902B may select a network appliance for the packet. At (11), the flow data store 902B provides the selected network appliance to the network device 608B. Therefore, the network device 608B is able to determine a network appliance for the packet.

As the network device 608B has determined a network appliance for the packet, the packet may be transmitted according to this determination. At (12), the network device 608B provides the packet to the selected network appliance. As noted above, in order to provide the second packet to the selected network appliance, the network device 608B may provide the second packet to an instance of the stateful network routing service corresponding to the network appliance (the same instance selected by network device 608A) and the instance of the stateful network routing service may select the network appliance (the same appliance selected for the first packet, such as based on a routing rule stored at the instance using a direction agnostic tuple value) and route the second packet to the selected network appliance.

Figure 10:
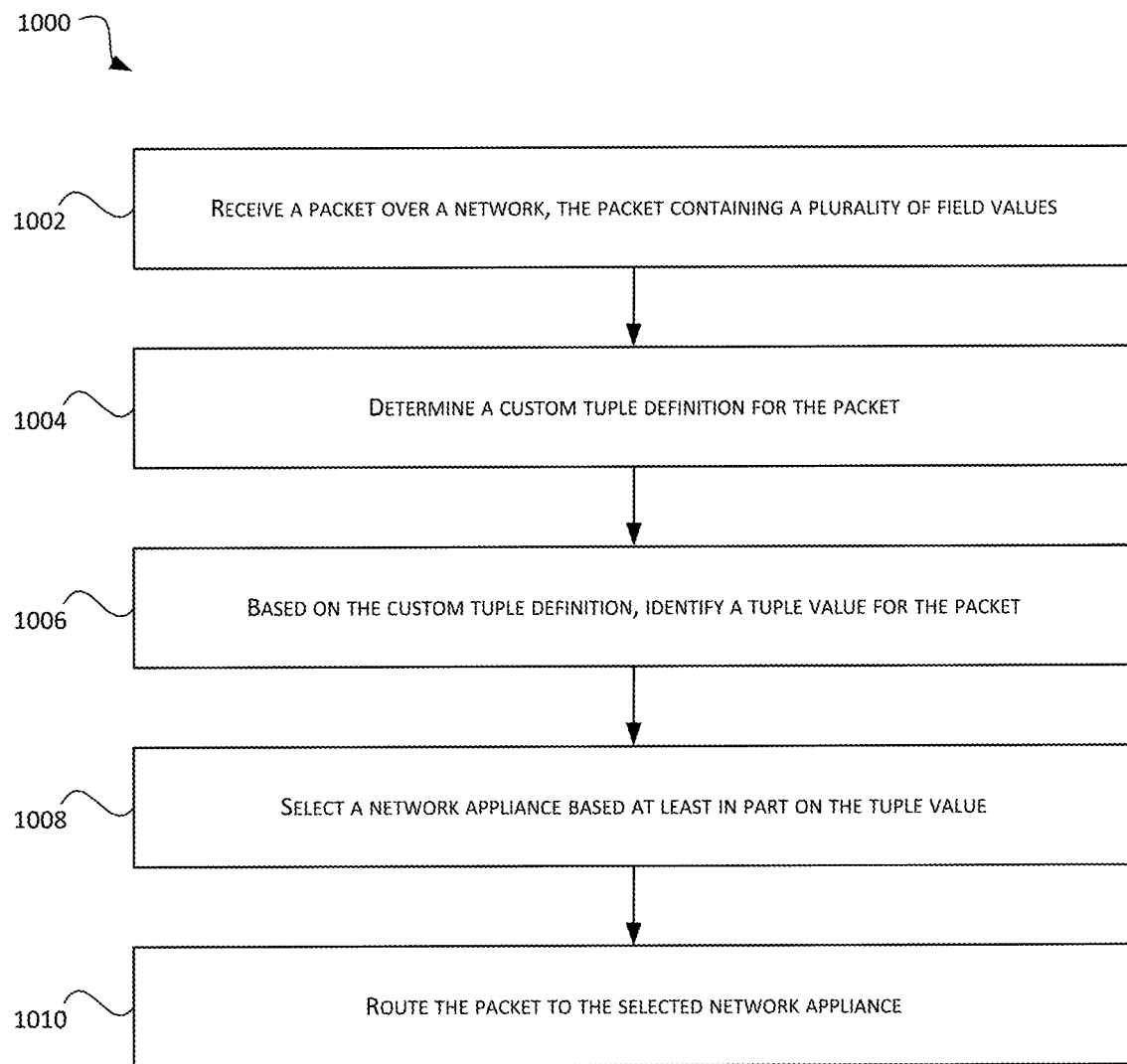
FIG. 10 is a flowchart of an example routine for receiving and passing a packet to a network appliance according to some embodiments.

As noted above, a client may define customized tuple definitions that are associated with a given subset of network traffic. The customized tuple definitions may be used by the stateful network routing service 106 to identify a tuple value associated with a particular packet and determine an appliance associated with the network appliance. FIG. 10 is a flowchart of an example routine for transmitting the packet to a network appliance based on the custom tuple definition. The routine 1000 may be carried out by the stateful network routing service 106 of FIG. 1.

The routine begins at block 1002, a stateful network routing service in communication with one or more computing environments receives a packet from a computing environment for transmission to a network appliance. The packet may further include flow information corresponding to a flow of network traffic (e.g., a source network host and a destination network host of the packet). The flow information may be represented by a plurality of field values. Therefore, the stateful network routing service may receive the packet and determine associated field values.

In order to determine how to route the packet, at block 1004, the stateful network routing service determines a custom tuple definition for the packet. The stateful network routing service may store data, either locally or remotely, indicating that certain network traffic is associated with a specific custom tuple definition. For example, a custom tuple definition may be applied to packets based on one or more of source IP address, destination IP address, source port, destination port, or protocol. Additionally, the custom tuple definition may be applied based on one or more additional field values. The custom tuple definition can be used to further identify a fields of a packet that should be used in defining a flow of network traffic and fields of a packet that should be ignored in defining the flow of network traffic.

Based on the custom tuple definition, at block 1006, the stateful network routing service may parse a packet to determine field values associated with the custom tuple definition. The field values define a tuple value that the stateful network routing service can use to route the packet. The tuple value may identify a plurality of field values of the packet where the combination of field values corresponds to a particular network appliance. The tuple value may further correspond to a particular flow of network traffic. The stateful network routing service may parse the packet to identify the tuple value based on fields, bit ranges, or other parameters indicated by the custom tuple definition. Therefore, the stateful network routing service uses the custom tuple definition to identify a particular tuple value.

As noted above, the stateful network routing service identifies a tuple value associated with the packet. At block 1008, the stateful network routing service selects a network appliance based at least in part on the identified tuple value. The stateful network routing service may communicate with a data store in order to determine whether tuple value is associated with a selected network appliance. For example, where the custom tuple definition indicates the custom tuple includes source IP, a given tuple value may include a particular source IP and the stateful network routing service may determine whether a particular network appliance has been selected for the particular source IP. In the event that the stateful network routing service determines that a network appliance has not been selected for a given tuple value, the stateful network routing service and/or the data store may select a network appliance for the tuple value.

At block 1010, the stateful network routing service transmits the packet to the selected network appliance in order for the network appliance to perform one or more operations on the packet. The stateful network routing service may transmit the packet to the network appliance based at least in part on a routing rule associated with the packet.

Figure 11:
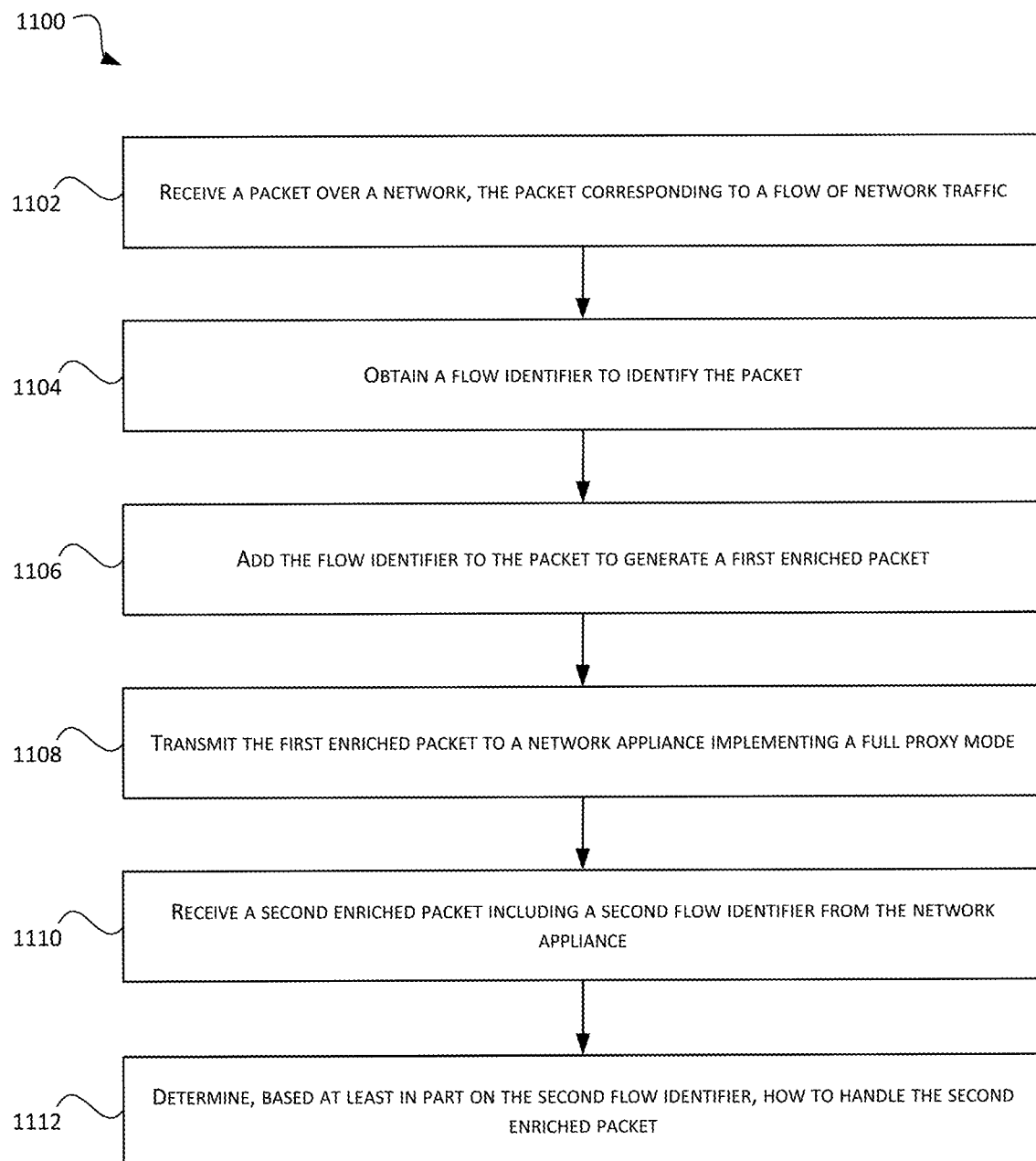
FIG. 11 is a flowchart of an example routine for receiving and passing a packet to a network appliance according to some embodiments.

As noted above, a stateful network routing service may transmit network traffic to a network appliance that is implementing full-proxy mode operations. Based on determining that the network appliance is a full-proxy mode network appliance, the stateful network routing service may add a flow identifier to the packet to identify modified version of the packet received in response to the packet. FIG. 11 is a flowchart of an example routine for adding the flow identifier to a packet being transmitted to a full-proxy mode appliance to identify a responsive packet. The routine 1100 may be carried out by the stateful network routing service 106 of FIG. 1.

As noted above, the routine begins at block 1102, a stateful network routing service in communication with one or more computing environments receives a packet from a computing environment for transmission to a network appliance. Based on a routing rule associated with the computing environment, the stateful network routing service may determine that the packet is to be sent to a full-proxy mode network appliance.

Based on determining that the packet is to be sent to a full-proxy mode network appliance, in order to identify a responsive packet received in response to the packet, at block 1104, the stateful network routing service obtains a flow identifier for the packet. The flow identifier may further be generated for the packet in response to a request for the flow identifier. For example, the flow identifier may be generated or obtained for the packet in response to determining that the packet is to be sent to a full-proxy mode network appliance. The flow identifier may be obtained from a flow data store associated with the stateful network routing service. In some embodiments, the flow identifier may be generated by the stateful network routing service and/or any other components of the system. In some embodiments, the stateful network routing service may further obtain a flow validator to validate the packet. Therefore, the stateful network routing service obtains the flow identifier to identify a responsive packet received from the network appliance.

In order to identify a modified version of the packet transmitted as a responsive packet, at block 1106, the stateful network routing service adds the flow identifier to the packet in order to generate a first enriched packet. As noted above, the flow identifier may be stored in the first enriched packet. In some embodiments, the flow validator and the flow identifier are stored in the packet. The flow identifier is added to the packet in order to identify a modified version of the packet received from the network appliance in response to the packet.

Based on adding the flow identifier to the packet, at block 1108, the stateful network routing service transmits the first enriched packet to a full-proxy mode network appliance in order for the full-proxy mode network appliance to perform one or more full-proxy mode operations on the first enriched packet.

As noted above, in response to transmitting the first enriched packet to the full-proxy mode network appliance, at block 1110, the stateful network routing service receives a second enriched packet from the full-proxy mode network appliance. The second enriched packet may be a modified version of the first enriched packet where the full-proxy mode network appliance may perform one or more full-proxy mode operations to modify the first enriched packet and generate the second enriched packet. During the modifications of the first enriched packet, one or more fields of the first enriched packet may be modified and therefore, fields of the first enriched packet may be dissimilar from fields of the second enriched packet. To aid in identification of the second enriched packet, the second enriched packet may include the flow identifier.

Based on receiving the second enriched packet, the stateful network routing service may verify the second enriched packet. At block 1112, the stateful network routing service determines, based on the flow identifier included within the second enriched packet, how to handle the second enriched packet. The stateful network routing service may determine that the flow identifier corresponds to the flow identifier of a previously transmitted packet (e.g., the first enriched packet). The stateful network routing service may compare the flow identifiers with flow identifiers stored in a cache of the stateful network routing service. Based on determining that the second enriched packet includes a valid flow identifier, the stateful network routing service may route the second enriched packet to the destination. In some embodiments, the stateful network routing service may determine that the second enriched packet does not contain a flow identifier or that the flow identifier does not correspond to a stored flow identifier and may drop the second enriched packet in response and/or send a notification to the source network host or destination network host that the packet has been dropped.

Figure 12:
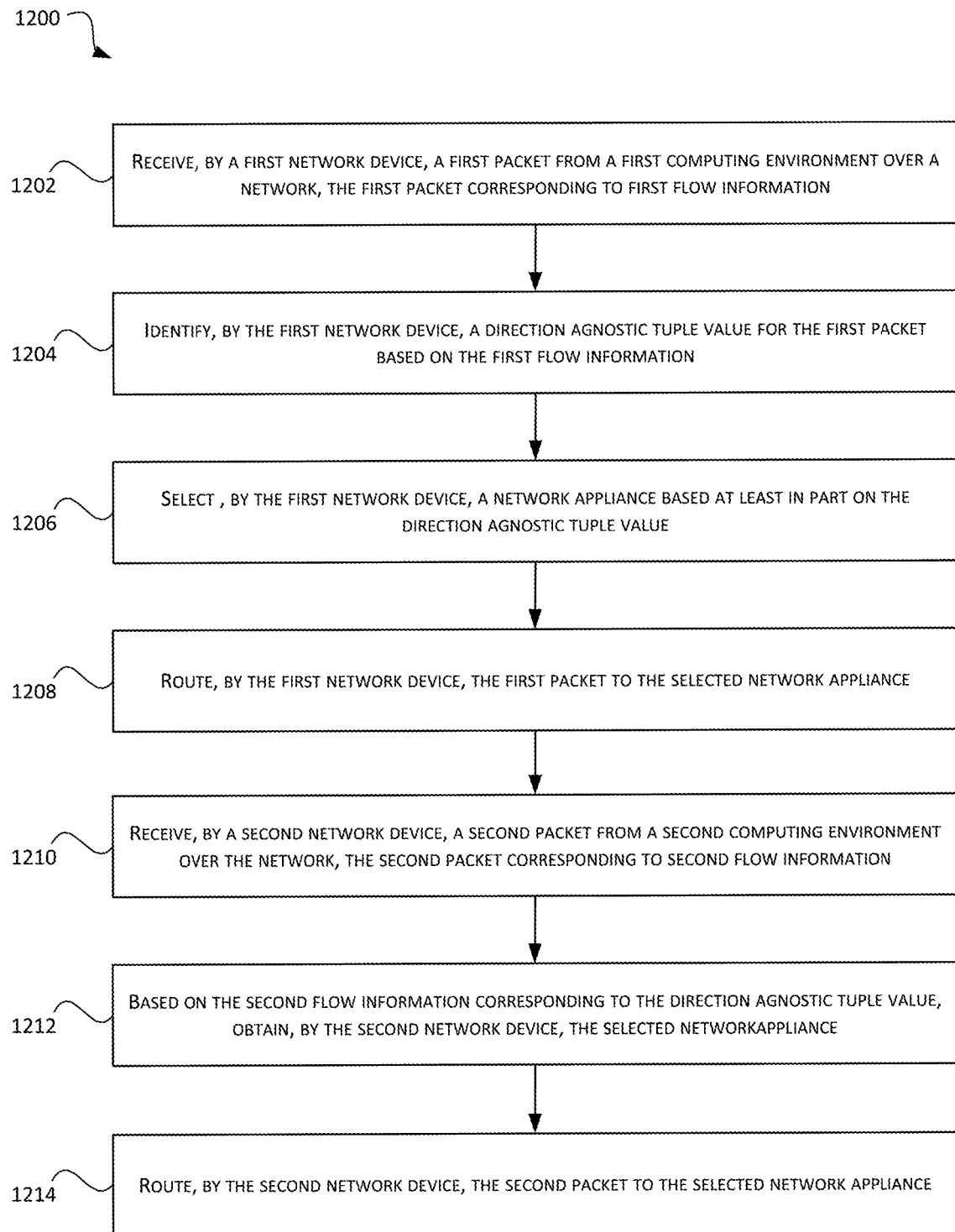
FIG. 12 is a flowchart of an example routine for receiving and passing a packet to a network appliance according to some embodiments.

FIG. 12 is a flowchart of an example routine for transmitting the packet to a selected network appliance from a plurality of network appliances. The routine may be carried out by the network device 104A, 104B of FIG. 1.

The routine begins at block 1202, a first network device in a first availability zone intercepts a packet being transmitted between network hosts across availability zones (e.g., a first computing environment in a first availability zone and a second computing environment in a second availability zone). Block 1202 may be similar to block 1002 of FIG. 10. The packet may further correspond to a bidirectional flow of network traffic between network hosts.

As noted above, the packet may correspond to a tuple definition indicating fields that should be used to determine a tuple value for the first packet. At block 1204, based at least in part on the tuple definition, the first network device may parse a packet containing first flow information to determine field values associated with the tuple definition that define a tuple value. The field values define a tuple value that the first network device can use to route the first packet. The field values of the packet may be a plurality of symmetrical field values (e.g., a first IP address and a second IP address). Block 1204 may be similar to block 1006 of FIG. 10. In addition, the tuple value may be a direction agnostic tuple value. The direction agnostic tuple value may be direction agnostic in that the field values of the tuple value may not be associated with a specific direction (e.g., source or destination) and may be associated with a group of data (e.g., IP addresses or ports). The field values of the direction agnostic tuple value may be ordered without regard to symmetrical position within the plurality of symmetrical field values. The tuple value may further correspond to a particular bidirectional flow of network traffic. Therefore, the first network device uses the tuple definition to identify a particular tuple value.

In order to route the first packet to a proper network appliance, at block 1206, based on the tuple value of the first packet and information stored in a flow data store, the first network device may select a network appliance for the first packet. Block 1206 may be similar to block 1008 of FIG. 10. For example, the flow data store may store routing decisions as "tuple value==>network appliance" and may provide the network appliance based on a query by the first network device. In some embodiments, the first network device may determine that a routing decision has been made for the first packet (e.g., a network appliance has been selected) and may obtain the routing rule from the flow data store. In other embodiments, based on the flow data store, the first network device may determine that the routing decision has not been previously been generated and may generate the routing decision based on the direction agnostic tuple value based on a flow hashing approach. For example, the routing decision may be based on an availability zone of the serviced environment and an availability zone of the network appliance. The routing decision may further be provided to additional network devices such as a second network device for use in making routing decisions. The first network device may provide a designation of the tuple value and a corresponding network appliance to the second network device Therefore, the first network device may determine a network appliance to route the first packet.

As noted above, a particular network appliance may be selected by the network device for a packet of network traffic. At block 1208, based on the routing rule, the first network device routes the first packet to a selected network appliance. Block 1208 may be similar to block 1010 of FIG. 10. Further, in some embodiments, in routing the first packet to the selected network appliance, the first network device may route the first packet to a gateway corresponding to the selected network appliance (e.g., an instance of the stateful routing service) in order for the gateway to transmit the first packet to the selected network appliance to perform one or more operations on the first packet.

As noted above, the first packet may correspond to a bidirectional flow of network traffic between network hosts. At block 1210, as discussed above, a second network device in a second availability zone intercepts a second packet corresponding to the second half of the bidirectional flow. For example, the second packet may correspond to traffic from a second computing environment in a second availability zone and a first computing environment in a first availability zone. The packet may further include second flow information based on a source and destination of the packet.

Based upon receiving the second packet with second flow information, at block 1210, the second network device identifies one or more field values from the second flow information of the second packet. As the second packet is a response to the first packet, the field values of the second packet may symmetrically mirror the field values of the first packet. The second network device may generate a tuple value based on the one or more field values of the second packet. As discussed above, the second network device may query a flow data store associated with the second network device to determine a network appliance associated with the tuple value. Based on the first network device providing the routing decision with the tuple value to the second network device, the second network device may determine a selected network appliance for the tuple value. Therefore, based on the second flow information and the tuple value, the second network device may obtain the selected gateway for transmission of the second packet.

As noted above, the second network device may obtain a selected network appliance for the second packet. At block 1212, based on the routing decision, the second network device routes the second packet to the same selected network appliance as the first packet. In some embodiments, the second packet may be routed to the same selected gateway as the first packet, and the gateway may route the second packet to the same network appliance as the first packet. The first network device and the second network device may route packets of the bidirectional flow of network traffic to the same network appliance in order for the same network appliance to perform one or more operations on both packets.

Figure 13:
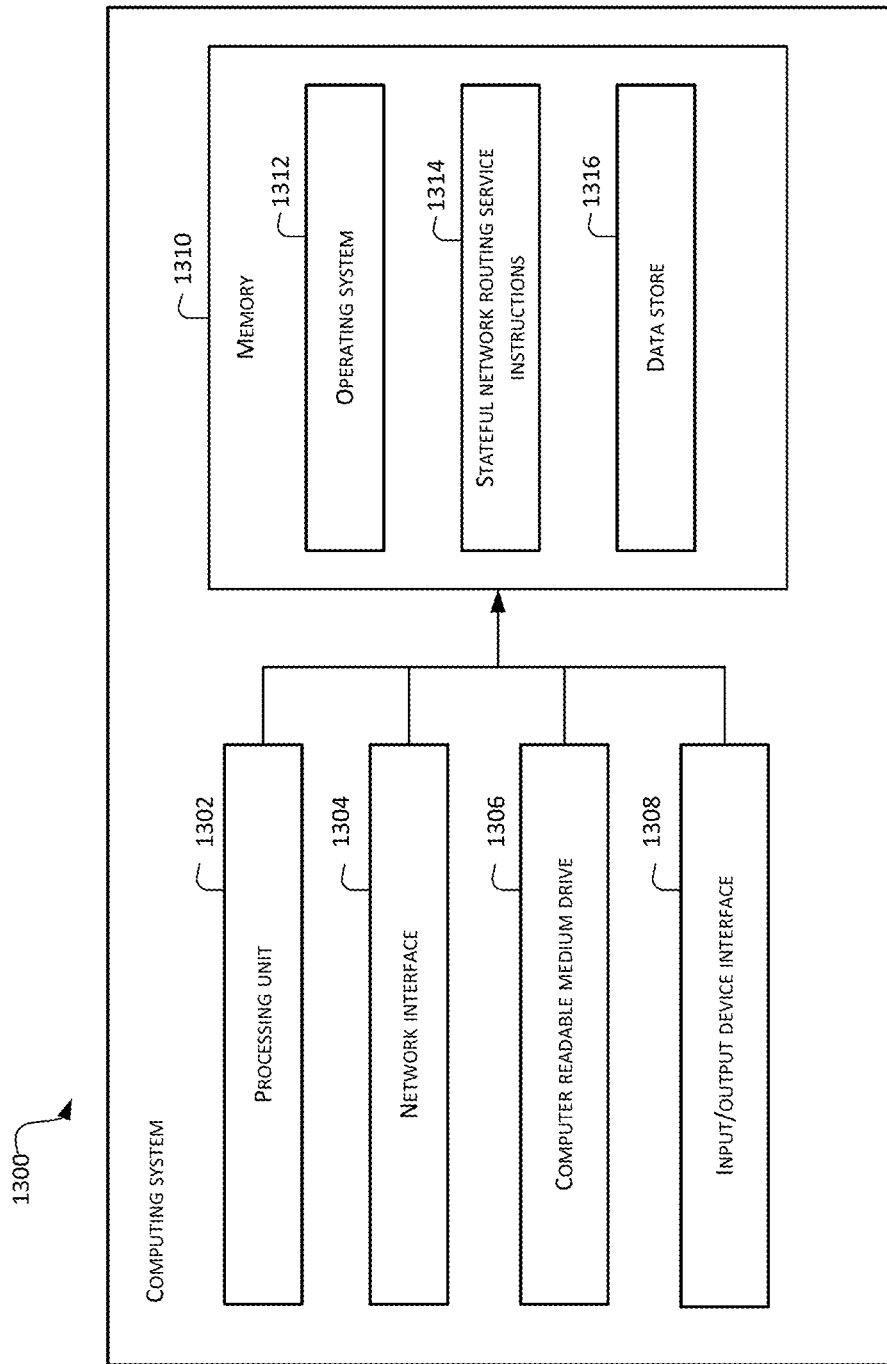
FIG. 13 shows an example computing device that may be used to implement aspects of the present disclosure.

FIG. 13 is a block diagram illustrating an example computing system, according to various embodiments. Computing system 1300 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device. In some embodiments, the computing system 1300 may correspond to the stateful network routing service 106. The computing system 1300 may include: one or more processing units 1302, such as physical central processing units ("CPUs"); one or more network gateways 1304, such as a network gateway cards ("NICs"); one or more computer-readable medium drives 1306, such as a high density disk ("HDDs"), solid state drives ("SDDs"), flash drives, and/or other persistent non-transitory computer-readable media; an input/output device gateway 1308, such as an input/output (TO) gateway in communication with one or more microphones; and one or more computer-readable memories 1310, such as random access memory ("RAM") and/or other volatile non-transitory computer-readable media.

In various embodiments, computing system 1300 may be a uniprocessor system including one processing unit 1302, or a multiprocessor system including several processing units 1302 (e.g., two, four, eight, or another suitable number). Processing units 1302 may be any suitable processors capable of executing instructions. For example, in various embodiments, processing units 1302 may be general-purpose or embedded processors implementing any of a variety of instruction set architectures (ISAs), such as the x86, PowerPC, SPARC, or MIPS ISAs, or any other suitable ISA. In multiprocessor systems, each of the processing units 1302 may commonly, but not necessarily, implement the same ISA. The computing system 1300 also includes one or more network communication devices (e.g., network gateway 1304) for communicating with other systems and/or components over a communications network (e.g. Internet, LAN, etc.).

In one embodiment, I/O device gateway 1308 may coordinate I/O traffic between the processing unit 1302, computer-readable memory 1310, and any peripheral devices in the system, including through network gateway 1304 or other peripheral gateways. In some embodiments, I/O device gateway 1308 may perform any necessary protocol, timing or other data transformations to convert data signals from one component (e.g., computer-readable memory 1310) into a format suitable for use by another component (e.g., processing unit 1302). In some embodiments, I/O device gateway 1308 may include support for devices attached through various types of peripheral buses, such as a variant of the Peripheral Component Interconnect (PCI) bus standard or the Universal Serial Bus (USB) standard, for example. In some embodiments, the function of I/O device gateway 1308 may be split into two or more separate components, such as a north bridge and a south bridge, for example. Also, in some embodiments, some or all of the functionality of I/O device gateway 1308, such as a gateway to computer-readable memory 1310, may be incorporated directly into processing unit 1302.

The network gateway 1304 may allow data to be exchanged between computing system 1300 and other devices attached to a network, such as other computer systems, for example. In addition, network gateway 1304 may allow communication between computing system 1300 and various I/O devices and/or remote storage (which may represent, for example, data stores 1316). Input/output devices may, in some embodiments, include one or more display terminals, keyboards, keypads, touchpads, scanning devices, voice, or optical recognition devices, or any other devices suitable for entering or retrieving data by one or more computing systems 1300. Multiple input/output devices may be present in computing system 1300 or may be distributed on various nodes of a distributed system that includes computing system 1300. In some embodiments, similar input/output devices may be separate from computing system 1300 and may interact with one or more nodes of a distributed system that includes computing system 1300 through a wired or wireless connection, such as over network gateway 1304. Network gateway 1304 may commonly support one or more wireless networking protocols (e.g., Wi-Fi/IEEE 802.11, or another wireless networking standard). However, in various embodiments, network gateway 1304 may support communication via any suitable wired or wireless general data networks, such as other types of Ethernet networks, for example. Additionally, network gateway 1304 may support communication via telecommunications/telephony networks such as analog voice networks or digital fiber communications networks, via storage area networks such as Fibre Channel Storage Area Networks (SANs), or via any other suitable type of network and/or protocol.

The processing unit 1302 can receive information and instructions from other computing systems or services via the network gateway 1304. The network gateway 1304 can also store data directly to the computer-readable memory 1310. The processing unit 1302 can communicate to and from the computer-readable memory 1310, execute instructions and process data in the computer-readable memory 1310, etc.

The computer-readable memory 1310 may include computer program instructions that the processing unit 1302 executes in order to implement one or more embodiments. The computer-readable memory 1310 can store an operating system 1312 that provides computer program instructions for use by the processing unit 1302 in the general administration and operation of the computing system 1300. The computer-readable memory 1310 can further include computer program instructions and other information for implementing aspects of the present disclosure. For example, in one embodiment, the computer-readable memory 1310 may include stateful network routing service instructions 1314. As another example, the computer-readable memory 1310 may include a data store 1316. In some embodiments, the data store 1316 may be a flow data store.

It will be understood that other applications may be stored in the computer-readable memory 1310. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the computer-readable memory 1310 and are executable by the processing unit 1302. In this respect, the term "executable" means a program file that is in a form that can ultimately be run by the processing unit 1302. Examples of executable programs may be, for example, a compiled program that can be translated into machine code in a format that can be loaded into a random access portion of the computer-readable memory 1310 and run by the processing unit 1302, source code that may be expressed in proper format such as object code that is capable of being loaded into a random access portion of the computer-readable memory 1310 and executed by the processing unit 1302, or source code that may be interpreted by another executable program to generate instructions in a random access portion of the computer-readable memory 1310 to be executed by the processing unit 1302, etc. An executable program may be stored in any portion or component of the computer-readable memory 1310 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components. It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have a gateway described in a machine-processable format, such as the Web Services Description Language (WSDL). Other systems may interact with the network-based service in a manner prescribed by the description of the network-based service's gateway. For example, the network-based service may define various operations that other systems may invoke, and may define a particular application programming gateway (API) to which other systems may be expected to conform when requesting the various operations. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as HTTP.

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions. Further, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Various example embodiments of the disclosure can be described by the following clauses:

Clause 1: A computing system, comprising:
  a first network environment including a first computing device;
  a second network environment including a second computing device;
  a network appliance, wherein the network appliance is a full-proxy network appliance that is configured to maintain distinct network connections to each party of a set of proxied communication sessions supported by the network appliance; and
  a network routing service configured to route data between the first network environment and the second network environment through the network appliance, the network routing service configured to:
    receive a packet from the first computing device, wherein the packet corresponds to a proxied communication session between the first computing device and the second computing device for which the network appliance is configured to provide full-proxy support, and wherein the packet includes a first set of header values corresponding to a first network connection between the first computing device and the network appliance,
    generate a first enriched packet by adding a flow identifier to the packet, the flow identifier identifying the first set of header values,
    transmit the first enriched packet to the network appliance,
    receive a second packet from the network appliance, the second packet including the flow identifier and a second set of header values corresponding to a second network connection between the network appliance and the second computing device,
    based at least in part on the second packet including the flow identifier, identify the second network connection as corresponding to the first network connection, and
    based at least in part on identifying the second network connection as corresponding to the first network connection, transmit the second packet to the second computing device.

Clause 2: The system of Clause 1, the network routing service further configured to:
receive a third packet from the network appliance, the third packet including a third set of header values corresponding to a third network connection between the network appliance and a third computing device, the third packet excluding the flow identifier;
based at least in part on the third packet not including the flow identifier, identify the third network connection as not corresponding to the first network connection; and
based at least in part on identifying the third network connection as not corresponding to the first network connection, drop the third packet.

Clause 3: The system of Clause 1, wherein the network appliance is configured to perform at least one of network address translation, transport layer security termination, or protocol translation on the packet.

Clause 4: The system of Clause 1, wherein the network routing service further configured to
encapsulate the first set of header values and the flow identifier within the first enriched packet, and wherein each header value of the first set of header values corresponds to at least one of a field value, a bit range, or a portion of the packet.

Clause 5: A computer-implemented method comprising:
receiving, by a network routing service, a packet from a first computing device of a first network environment and addressed to a second computing device of a second network environment, wherein the network routing service routes data between the first computing device and the second computing device through a network appliance configured to act as a proxy between the first and second computing devices, wherein the packet corresponds to a proxied communication session between the first computing device and a second computing device, and wherein the packet includes a first set of values corresponding to a first network connection between the first computing device and the network appliance;
generating, by the network routing service, a first enriched packet by adding a flow identifier to the packet, the flow identifier identifying the first set of values;
transmitting, by the network routing service, the first enriched packet to the network appliance;
receiving, by the network routing service, a second packet from the network appliance, the second packet including the flow identifier and a second set of values corresponding to a second network connection between the network appliance and the second computing device; and
based at least in part on the second packet including the flow identifier, transmitting, by the network routing service, the second packet to the second computing device.

Clause 6: The computer-implemented method of Clause 5, wherein the network appliance is configured to maintain distinct network connections to the first computing device and the second computing device, wherein the network appliance performs at least one of network address translation, transport layer security termination, or protocol translation on the packet.

Clause 7: The computer implemented method of Clause 5, further comprising,
based at least in part on the second packet including the flow identifier, identifying the second network connection as corresponding to the first network connection; and
determining that the second packet is a response to the packet.

Clause 8: The computer-implemented method of Clause 5, further comprising:
receiving, by the network routing service a third packet from the network appliance, the third packet including a second flow identifier and a third set of values;
determining, by the network routing service, that the second flow identifier does not correspond to the flow identifier; and
based at least in part on determining that the second flow identifier does not correspond to the flow identifier, dropping, by the network routing service, the third packet.

Clause 9: The computer-implemented method of Clause 5, wherein the first set of values and the second set of values comprise different sets of values, the computer-implemented method further comprising linking the first set of values and the second set of values.

Clause 10: The computer-implemented method of Clause 5, further comprising:
receiving, by the network routing service, a third packet from the network appliance, the third packet including a third set of values;
determining, by the network routing service, that the third packet does not include the flow identifier; and
based at least in part on the third packet not including the flow identifier, dropping, by the network routing service, the third packet.

Clause 11: The computer-implemented method of Clause 5, wherein the flow identifier comprises one or more randomly assigned numbers.

Clause 12: The computer-implemented method of Clause 5, further comprising:
obtaining, by the network routing service, a first flow validator, wherein the first flow validator is generated for the proxied communication session between the first computing device and the second computing device;
adding, by the network routing service, the first flow validator to the first enriched packet, wherein the second packet includes a second flow validator; and
validating, by the network routing service, the second packet by verifying that the first flow validator of the first enriched packet matches the second flow validator of the second packet and that the second packet includes the flow identifier.

Clause 13: A computing system implementing a network routing service configured to route data between the plurality of computing devices through the full-proxy network appliance, wherein the network routing service maintains distinct network connections to each party of a set of proxied communication sessions supported by the full-proxy network appliance, wherein the computing system, during implementation of network routing service, is configured to:
receive a packet from a first computing device of the plurality of computing devices, wherein the packet corresponds to a proxied communication session between the first computing device and a second computing device of the plurality of computing devices, and wherein the packet includes a first set of values corresponding to a first network connection between the first computing device and the full-proxy network appliance;

generate a first enriched packet by adding a flow identifier to the packet, the flow identifier identifying the first set of values;

transmit the first enriched packet to the full-proxy network appliance;

receive a second packet from the full-proxy network appliance, the second packet including the flow identifier and a second set of values corresponding to a second network connection between the full-proxy network appliance and the second computing device; and based at least in part on the second packet including the flow identifier, transmit the second packet to the second computing device.

Clause 14: The system of Clause 13, wherein the full-proxy network appliance performs at least one of network address translation, transport layer security termination, or protocol translation on the packet.

Clause 15: The system of Clause 13, the network routing service further configured to:

based at least in part on the second packet including the flow identifier, identify the second network connection as corresponding to the first network connection; and based at least in part on identifying the second network connection as corresponding to the first network connection, determine the second packet is a response to the packet.

Clause 16: The system of Clause 13, the network routing service configured to:

receive a third packet from the full-proxy network appliance, the third packet including a second flow identifier and a third set of values corresponding to a third network connection between the full-proxy network appliance and a third computing device of the plurality of computing devices;

determine that the second flow identifier does not correspond to the flow identifier; and based at least in part on determining that the second flow identifier does not correspond to the flow identifier, drop the third packet.

Clause 17: The system of Clause 13, wherein the first set of values and the second set of values comprise different sets of values, the network routing service, based at least in part on the second packet including the flow identifier, further configured to link the first set of values and the second set of values.

Clause 18: The system of Clause 13, the network routing service further configured to:

receive a third packet from the full-proxy network appliance, the third packet including a third set of values corresponding to a third network connection between the full-proxy network appliance and a third computing device of the plurality of computing devices, wherein the third packet does not include the flow identifier;

determine that the third packet does not include the flow identifier; and based at least in part on third packet not including the flow identifier, drop the third packet.

Clause 19: The system of Clause 13, wherein the flow identifier comprises one or more randomly assigned numbers.

Clause 20: The system of Clause 13, the network routing service further configured to:

obtain a first flow validator, wherein the first flow validator is generated for the proxied communication session between the first computing device and the second computing device;

add the first flow validator to the first enriched packet, wherein the second packet includes a second flow validator; and validate the second packet by verifying that the first flow validator of the first enriched packet matches the second flow validator of the second packet and that the second packet includes the flow identifier.

Various example embodiments of the disclosure can be described by the following clauses:

Clause 1: A computing system, comprising:

a fleet of network appliances;

a plurality of network environments of a cloud computing environment, wherein each network environment is associated with a respective tuple definition, wherein the respective tuple definition indicates a manner of identifying flows of network traffic stemming from the network environments; and a stateful network routing service configured to route data between the plurality of network environments and the fleet of network appliances, the stateful network routing service configured to:

receive a first packet from a first network environment of the plurality of network environments, wherein the first packet includes a plurality of field values, obtain a first tuple definition associated with the first network environment, wherein the first tuple definition identifies a set of fields, based at least in part on the first tuple definition, generate a tuple value for the first packet, the tuple value including a set of field values, from the plurality of field values, that correspond to the set of fields within the first tuple definition, select a first network appliance of the fleet of network appliances to which to route packets associated with the tuple value, store a routing rule indicating that subsequent packets associated with the tuple value are to be routed to the first network appliance, and route the first packet to the first network appliance.

Clause 2: The system of Clause 1, the stateful network routing service further configured to:

receive a second packet from a second network environment of the plurality of network environments, wherein the second packet includes a second plurality of field values;

obtain a second tuple definition associated with the second network environment, wherein the second tuple definition identifies a second set of fields, wherein the second set of fields and the set of fields include one or more of different fields or a different number of fields;

based at least in part on the second tuple definition, generate a second tuple value for the second packet, the second tuple value including a second set of field values, from the plurality of field values, that correspond to the second set of fields within the second tuple definition;

select a second network appliance of the fleet of network appliances to which to route packets associated with the second tuple value;

store a second routing rule indicating that subsequent packets associated with the second tuple value are to be routed to the second network appliance; and route the second packet to the second network appliance.

Clause 3: The system of Clause 1, wherein the set of fields identified by the first tuple definition includes one or more of a source IP address, a destination IP address, a source port, a destination port, or a protocol.

Clause 4: The system of Clause 1, wherein the first packet comprises an internet protocol (IP) packet, the first packet including a packet header and packet data, wherein a field of the set of fields corresponds to at least one of a bit range of the packet header, a custom portion of the packet header, or a custom field definition.

Clause 5: A computer-implemented method comprising:
receiving, by a stateful network routing service, a packet from a first network environment of a plurality of network environments, wherein each network environment of the plurality of network environments is associated with a respective tuple definition indicating a manner of identifying flows of network traffic, wherein the packet includes a set of data;

obtaining, by the stateful network routing service, a first tuple definition associated with the first network environment, wherein the first tuple definition indicates a filtering criteria;

based at least in part on the first tuple definition, generating a tuple value for the packet, the tuple value including a subset of data, from the set of data, that corresponds to the filtering criteria within the first tuple definition;

selecting a first network appliance of a fleet of network appliances to which to route packets associated with the tuple value;

storing a routing rule indicating that subsequent packets associated with the tuple value are to be routed to the first network appliance; and routing, by the stateful network routing service, the packet to the first network appliance.

Clause 6: The computer-implemented method of Clause 5, wherein the packet includes a packet header and packet data, wherein the filtering criteria corresponds to at least one of a bit range of the packet header, a field of the packet header, a data point of the packet header, or a property of the packet header.

Clause 7: The computer-implemented method of Clause 5, wherein the filtering criteria includes one or more of a source IP address, a destination IP address, a source port, a destination port, or a protocol.

Clause 8: The computer-implemented method of Clause 5, further comprising:
receiving, by the stateful network routing service, a second packet from a second network environment of the plurality of network environments, wherein the second packet includes a second set of data;

obtaining, by the stateful network routing service, a second tuple definition associated with the second network environment, wherein the second tuple definition indicates a second filtering criteria, wherein the filtering criteria and the second filtering criteria comprise different filtering criteria;

based at least in part on the second tuple definition, generating a second tuple value for the second packet, the second tuple value including a second subset of data, from the second set of data, that correspond to the second filtering criteria of the second tuple definition;

selecting, by the stateful network routing service, a second network appliance of the fleet of network appliances to which to route packets associated with the second tuple value; and routing, by the stateful network routing service, the second packet to the second network appliance.

Clause 9: The computer-implemented method of Clause 5, wherein the set of data includes a plurality of field values, wherein the set of data identifies a set of fields and the subset of data including a set of field values, from the plurality of field values.

Clause 10: The computer-implemented method of Clause 5,
receiving, by the stateful network routing service, a second packet from the first network environment, wherein the second packet includes a second set of data;

determining, by the stateful network routing service, that the second packet is associated with the tuple value based at least in part on the second set of data; and based at least in part on the routing rule and determining that the second packet is associated with the tuple value, routing, by the stateful network routing service, the second packet to the first network appliance.

Clause 11: The computer-implemented method of Clause 5, wherein the filtering criteria of the first tuple definition includes one or more customizable filtering criteria.

Clause 12: A computing system, comprising:
a stateful network routing service configured to route data between a plurality of network environments and a fleet of network appliances, wherein each network environment of the plurality of network environments is associated with a respective tuple definition indicating a manner of identifying flows of network traffic, the stateful network routing service configured to:
receive a packet from a first network environment of the plurality of network environments, wherein the packet includes a set of data;

obtain a first tuple definition associated with the first network environment, wherein the first tuple definition indicates a filtering criteria;

based at least in part on the first tuple definition, generate a tuple value for the packet, the tuple value including a subset of data, from the set of data, that correspond to the filtering criteria of the first tuple definition;

select a first network appliance of the fleet of network appliances to which to route packets associated with the tuple value; and route the packet to the first network appliance.

Clause 13: The system of Clause 12, wherein the packet includes a packet header and packet data, wherein the filtering criteria corresponds to at least one of a bit range of the packet header, a field of the packet header, a data point of the packet header, or a property of the packet header.

Clause 14: The system of Clause 12, wherein the filtering criteria includes one or more of a source IP address, a destination IP address, a source port, a destination port, or a protocol.

Clause 15: The system of Clause 12, the stateful network routing service further configured to:
  receive a second packet from a second network environment of the plurality of network environments, wherein the second packet includes a second set of data;
  obtain a second tuple definition associated with the second network environment, wherein the second tuple definition indicates a second filtering criteria, wherein the filtering criteria and the second filtering criteria comprise different filtering criteria;
  based at least in part on the second tuple definition, generate a second tuple value for the second packet, the second tuple value including a second subset of data, from the second set of data, that correspond to the second filtering criteria of the second tuple definition;
  select a second network appliance of the fleet of network appliances to which to route packets associated with the second tuple value; and
  route the second packet to the second network appliance.

Clause 16: The system of Clause 12, wherein the packet comprises an internet protocol packet.

Clause 17: The system of Clause 12, the stateful network routing service further configured to store a routing rule indicating that subsequent packets associated with the tuple value are to be routed to the first network appliance.

Clause 18: The system of Clause 17, the stateful network routing service further configured to:
  receive a second packet from the first network environment, wherein the second packet includes a second set of data;
  determine that the second packet is associated with the tuple value based at least in part on the second set of data; and
  based at least in part on the routing rule and determining that the second packet is associated with the tuple value, route the second packet to the first network appliance.

Clause 19: The system of Clause 12, wherein the filtering criteria of the first tuple definition includes one or more customizable filtering criteria.

Clause 20: The system of Clause 12, further comprising:
  a network device, wherein the network device performs network address translation on a second packet received from a second network environment to generate a first translated packet and network address translation on a third packet received from a third network environment to generate a second translated packet, and
  the stateful network routing service further configured to:
    receive the first translated packet from the network device, wherein the first translated packet includes a second set of data;
    obtain a second tuple definition associated with the second network environment, wherein the second tuple definition identifies a source IP address associated with the network device;
    based at least in part on the second tuple definition, generate a second tuple value for the first translated packet, the second tuple value including a source IP address value from the second set of data;
    select a second network appliance of the fleet of network appliances to which to route packets associated with the second tuple value;
    store a second routing rule indicating that subsequent packets associated with the second tuple value are to be routed to the second network appliance;
    route the first translated packet to the second network appliance;
    receive the second translated packet from the network device, wherein the second translated packet includes a third set of data;
    determine that the second packet is associated with the second tuple value based at least in part on the third set of data; and
    based at least in part on the second routing rule and determining that the second translated packet is associated with the second tuple value, route the second translated packet to the second network appliance.

Various example embodiments of the disclosure can be described by the following clauses:

Clause 1: A system, comprising:
  a fleet of network appliances implemented across a first availability zone and a second availability zone, each of the first availability zone and the second availability zone representing an isolated network environment;
  a first network device within the first availability zone and configured to:
    receive a first packet from a device within the first availability zone and addressed to a second device within the second availability zone, the first packet including a plurality of symmetrical field values,
    identify a direction agnostic tuple value for the first packet, the direction agnostic tuple value including a set of field values, from the plurality of symmetrical field values, that are ordered, within the direction agnostic tuple value, without regard to symmetrical position within the plurality of symmetrical field values,
    select a network appliance, from the fleet of network appliances, to which to route packets associated with the direction agnostic tuple value,
    memorialize selection of the network appliance within a routing rule indicating that packets associated with the direction agnostic tuple value are to be routed to the network appliance,
    propagate the routing rule to a second network device associated with the second availability zone, and
    route the first packet to the network appliance,
  wherein the second network device is configured to:
    receive a second packet from the second device, wherein the second packet is responsive to the first packet and is addressed to the device within the first availability zone, the second packet including a second plurality of symmetrical field values symmetrically mirroring the plurality of symmetrical field values,
    derive from the second plurality of symmetrical field values the direction agnostic tuple value,
    identify the routing rule indicating that packets associated with the direction agnostic tuple value are to be routed to the network appliance, and
    responsive to identifying the routing rule, route the second packet to the network appliance.

Clause 2: The system of Clause 1, wherein the fleet of network appliances is distributed across availability zones, wherein the network appliance is within a first availability zone, wherein selecting the network appliance within the first availability zone is based at least in part on receiving the first packet from a device within the first availability zone Clause 3: The system of Clause 1, wherein the direction agnostic tuple value is based at least at part on one or more of:
 a group of internet protocol addresses of the first packet,
 a group of ports of the first packet, or
 a protocol of the first packet.

Clause 4: The system of Clause 1, wherein the first network device propagates the routing rule to the second network device associated with the second availability zone prior to routing the first packet to the network appliance.

Clause 5: A computer-implemented method comprising:
 receiving a first packet from a first device associated with a first party addressed to a second device associated with a second party, the first packet including a plurality of symmetrical field values;
 identifying a direction agnostic tuple value for the first packet, the direction agnostic tuple value including a set of field values, from the plurality of symmetrical field values, that are ordered, within the direction agnostic tuple value, without regard to symmetrical position within the plurality of symmetrical field values;
 selecting a network appliance to which to route packets associated with the direction agnostic tuple value;
 memorializing selection of the network appliance within a routing rule indicating that packets associated with the direction agnostic tuple value are to be routed to the network appliance;
 propagating the routing rule to the second device;
 routing the first packet to the network appliance;
 receiving a second packet from the second device addressed to the first device, the second packet including a second plurality of symmetrical field values symmetrically mirroring the plurality of symmetrical field values;
 deriving from the second plurality of symmetrical field values the direction agnostic tuple value;
 identifying the routing rule indicating that packets associated with the direction agnostic tuple value are to be routed to the network appliance; and
 responsive to identifying the routing rule, routing the second packet to the network appliance.

Clause 6: The computer-implemented method of Clause 5, wherein selecting the network appliance to which to route packets associated with the direction agnostic tuple value comprises selecting a group of network appliances associated with a gateway, wherein the routing rule indicates that packets associated with the direction agnostic tuple value are to be routed to the group of network appliances through the gateway, and wherein routing the first packet to the network appliance comprises routing the first packet to the gateway.

Clause 7: The computer-implemented method of Clause 5, wherein selecting the network appliance comprises selecting the network appliance from a group of network appliances, wherein the group of network appliances is distributed across availability zones.

Clause 8: The computer-implemented method of Clause 7, wherein the network appliance is within a first availability zone, wherein selecting the network appliance within the first availability zone is based at least in part on the first device corresponding to the first availability zone.

Clause 9: The computer-implemented method of Clause 5, wherein receiving the first packet from the first device comprises receiving the first packet by a first gateway associated with the first device, wherein receiving the second packet from the second device comprises receiving the second packet by a second gateway associated with the second device.

Clause 10: The computer-implemented method of Clause 5, wherein the first device is associated with a first availability zone, wherein the second device is associated with a second availability zone.

Clause 11: The computer-implemented method of Clause 10, further comprising:
 storing the routing rule in memory of the first device; and
 storing the routing rule in memory of the second device.

Clause 12: The computer-implemented method of Clause 5, further comprising:
 receiving a third packet from the second device addressed to a third device associated with a third party, the first packet including a third plurality of symmetrical field values;
 identifying a second direction agnostic tuple value for the second packet, the second direction agnostic tuple value including a second set of field values from the third plurality of symmetrical field values that are ordered, within the second direction agnostic tuple value, without regard to symmetrical position within the third plurality of symmetrical field values;
 determining a second routing rule for the third packet is not stored;
 selecting a second network appliance to which to route packets associated with the second direction agnostic tuple value;
 memorializing selection of the second network appliance within a second routing rule indicating that packets associated with the second direction agnostic tuple value are to be routed to the second network appliance;
 propagating the routing rule to the second device; and
 routing the third packet to the second network appliance.

Clause 13: The computer-implemented method of Clause 5, wherein the set of field values include one or more of a set of internet protocol addresses or a set of ports.

Clause 14: The computer-implemented method of Clause 5, wherein propagating the routing rule to the second device occurs prior to routing the first packet to the network appliance.

Clause 15: A system, comprising:
 a data store storing computer executable instructions, and
 one or more computing devices configured to:
  receive a first packet, the first packet including a plurality of symmetrical field values;
  identify a direction agnostic tuple value for the first packet, the direction agnostic tuple value including a set of field values from the plurality of symmetrical field values that are ordered, within the direction agnostic tuple value, without regard to symmetrical position within the plurality of symmetrical field values;

select a network appliance to which to route packets associated with the direction agnostic tuple value;

memorialize selection of the network appliance within a routing rule indicating that packets associated with the direction agnostic tuple value are to be routed to the network appliance;

route the first packet to the network appliance;

receive a second packet, wherein the second packet is responsive to the first packet, the second packet including a second plurality of symmetrical field values symmetrically mirroring the plurality of symmetrical field values;

derive, from the second plurality of symmetrical field values, the direction agnostic tuple value;

identify the routing rule indicating that packets associated with the direction agnostic tuple value are to be routed to the network appliance; and based at least in part on the routing rule, route the second packet to the network appliance.

Clause 16: The system of Clause 15, wherein the one or more computing devices are further configured to propagate the routing rule across multiple availability zones.

Clause 17: The system of Clause 15, wherein selecting the network appliance to which to route packets associated with the direction agnostic tuple value comprises selecting a group of network appliances associated with a gateway, wherein the routing rule indicates that packets associated with the direction agnostic tuple value are to be routed to the group of network appliances through the gateway, and wherein routing the first packet to the network appliance comprises routing the first packet to the gateway.

Clause 18: The system of Clause 15, wherein the network appliance corresponds to a group of network appliances distributed across availability zones.

Clause 19: The system of Clause 15, wherein the one or more computing devices are further configured to:
receive a third packet, the first packet including a third plurality of symmetrical field values;
determine a second routing rule for the third packet is not stored;
identify a second direction agnostic tuple value for the third packet, the second direction agnostic tuple value including a second set of field values from the third plurality of symmetrical field values that are ordered, within the second direction agnostic tuple value, without regard to symmetrical position within the third plurality of symmetrical field values;
select a second network appliance to which to route packets associated with the second direction agnostic tuple value;
memorialize selection of the second network appliance within a second routing rule indicating that packets associated with the second direction agnostic tuple value are to be routed to the second network appliance; and
route the third packet to the second network appliance.

Clause 20: The system of Clause 15, wherein the set of field values include one or more of a set of internet protocol addresses or a set of ports.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. A processor device can be a microprocessor, but in the alternative, the processor device can be a controller, microcontroller, or state machine, combinations of the same, or the like. A processor device can include electrical circuitry to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the Clauses are to be embraced within their scope.

What is claimed is:

1. A computing system, comprising:
    a first network environment including a first computing device;
    a second network environment including a second computing device;
    a network appliance, wherein the network appliance is a full-proxy network appliance that is configured to maintain distinct network connections to each party of a set of proxied communication sessions supported by the network appliance; and
    a network routing service configured to route data between the first network environment and the second network environment through the network appliance, the network routing service configured to:
        receive a packet from the first computing device, wherein the packet corresponds to a proxied communication session between the first computing device and the second computing device for which the network appliance is configured to provide full-proxy support, and wherein the packet includes a first set of header values corresponding to a first network connection between the first computing device and the network appliance,
        generate a first enriched packet by adding a flow identifier to the packet, the flow identifier identifying the first set of header values,
        transmit the first enriched packet to the network appliance,
        receive a second packet from the network appliance, the second packet including the flow identifier and a second set of header values corresponding to a second network connection between the network appliance and the second computing device,
        based at least in part on the second packet including the flow identifier, identify the second network connection as corresponding to the first network connection, and
        based at least in part on identifying the second network connection as corresponding to the first network connection, transmit the second packet to the second computing device.

2. The system of claim 1, the network routing service further configured to:
    receive a third packet from the network appliance, the third packet including a third set of header values corresponding to a third network connection between the network appliance and a third computing device, the third packet excluding the flow identifier;
    based at least in part on the third packet not including the flow identifier, identify the third network connection as not corresponding to the first network connection; and
    based at least in part on identifying the third network connection as not corresponding to the first network connection, drop the third packet.

3. The system of claim 1, wherein the network appliance is configured to perform at least one of network address translation, transport layer security termination, or protocol translation on the packet.

4. The system of claim 1, wherein the network routing service further configured to
    encapsulate the first set of header values and the flow identifier within the first enriched packet, and wherein each header value of the first set of header values corresponds to at least one of a field value, a bit range, or a portion of the packet.

5. A computer-implemented method comprising:
    receiving, by a network routing service, a packet from a first computing device of a first network environment and addressed to a second computing device of a second network environment, wherein the network routing service routes data between the first computing device and the second computing device through a network appliance configured to act as a proxy between the first and second computing devices, wherein the packet corresponds to a proxied communication session between the first computing device and a second computing device, and wherein the packet includes a first set of values corresponding to a first network connection between the first computing device and the network appliance;
    generating, by the network routing service, a first enriched packet by adding a flow identifier to the packet, the flow identifier identifying the first set of values;
    transmitting, by the network routing service, the first enriched packet to the network appliance;
    receiving, by the network routing service, a second packet from the network appliance, the second packet including the flow identifier and a second set of values corresponding to a second network connection between the network appliance and the second computing device; and based at least in part on the second packet including the flow identifier, transmitting, by the network routing service, the second packet to the second computing device.

6. The computer-implemented method of claim 5, wherein the network appliance is configured to maintain distinct network connections to the first computing device and the second computing device, wherein the network appliance performs at least one of network address translation, transport layer security termination, or protocol translation on the packet.

7. The computer implemented method of claim 5, further comprising,
based at least in part on the second packet including the flow identifier, identifying the second network connection as corresponding to the first network connection; and
determining that the second packet is a response to the packet.

8. The computer-implemented method of claim 5, further comprising:
receiving, by the network routing service a third packet from the network appliance, the third packet including a second flow identifier and a third set of values;
determining, by the network routing service, that the second flow identifier does not correspond to the flow identifier; and
based at least in part on determining that the second flow identifier does not correspond to the flow identifier, dropping, by the network routing service, the third packet.

9. The computer-implemented method of claim 5, wherein the first set of values and the second set of values comprise different sets of values, the computer-implemented method further comprising linking the first set of values and the second set of values.

10. The computer-implemented method of claim 5, further comprising:
receiving, by the network routing service, a third packet from the network appliance, the third packet including a third set of values;
determining, by the network routing service, that the third packet does not include the flow identifier; and
based at least in part on the third packet not including the flow identifier, dropping, by the network routing service, the third packet.

11. The computer-implemented method of claim 5, wherein the flow identifier comprises one or more randomly assigned numbers.

12. The computer-implemented method of claim 5, further comprising:
obtaining, by the network routing service, a first flow validator, wherein the first flow validator is generated for the proxied communication session between the first computing device and the second computing device;
adding, by the network routing service, the first flow validator to the first enriched packet, wherein the second packet includes a second flow validator; and
validating, by the network routing service, the second packet by verifying that the first flow validator of the first enriched packet matches the second flow validator of the second packet and that the second packet includes the flow identifier.

13. A computing system implementing a network routing service configured to route data between the plurality of computing devices through the full-proxy network appliance, wherein the network routing service maintains distinct network connections to each party of a set of proxied communication sessions supported by the full-proxy network appliance, wherein the computing system, during implementation of network routing service, is configured to:
receive a packet from a first computing device of the plurality of computing devices, wherein the packet corresponds to a proxied communication session between the first computing device and a second computing device of the plurality of computing devices, and wherein the packet includes a first set of values corresponding to a first network connection between the first computing device and the full-proxy network appliance;
generate a first enriched packet by adding a flow identifier to the packet, the flow identifier identifying the first set of values;
transmit the first enriched packet to the full-proxy network appliance;
receive a second packet from the full-proxy network appliance, the second packet including the flow identifier and a second set of values corresponding to a second network connection between the full-proxy network appliance and the second computing device; and
based at least in part on the second packet including the flow identifier, transmit the second packet to the second computing device.

14. The system of claim 13, wherein the full-proxy network appliance performs at least one of network address translation, transport layer security termination, or protocol translation on the packet.

15. The system of claim 13, the network routing service further configured to:
based at least in part on the second packet including the flow identifier, identify the second network connection as corresponding to the first network connection; and
based at least in part on identifying the second network connection as corresponding to the first network connection, determine the second packet is a response to the packet.

16. The system of claim 13, the network routing service configured to:
receive a third packet from the full-proxy network appliance, the third packet including a second flow identifier and a third set of values corresponding to a third network connection between the full-proxy network appliance and a third computing device of the plurality of computing devices;
determine that the second flow identifier does not correspond to the flow identifier; and
based at least in part on determining that the second flow identifier does not correspond to the flow identifier, drop the third packet.

17. The system of claim 13, wherein the first set of values and the second set of values comprise different sets of values, the network routing service, based at least in part on the second packet including the flow identifier, further configured to link the first set of values and the second set of values.

18. The system of claim 13, the network routing service further configured to:
receive a third packet from the full-proxy network appliance, the third packet including a third set of values corresponding to a third network connection between the full-proxy network appliance and a third computing device of the plurality of computing devices, wherein the third packet does not include the flow identifier;
determine that the third packet does not include the flow identifier; and
based at least in part on third packet not including the flow identifier, drop the third packet.

19. The system of claim 13, wherein the flow identifier comprises one or more randomly assigned numbers.

20. The system of claim 13, the network routing service further configured to:
obtain a first flow validator, wherein the first flow validator is generated for the proxied communication session between the first computing device and the second computing device;
add the first flow validator to the first enriched packet, wherein the second packet includes a second flow validator; and
validate the second packet by verifying that the first flow validator of the first enriched packet matches the second flow validator of the second packet and that the second packet includes the flow identifier.

* * * * *